US012798874B2

(12) United States Patent
Buck et al.

(10) Patent No.: US 12,798,874 B2
(45) Date of Patent: Nov. 17, 2026

(54) RECEPTACLE-ASSEMBLY RIM SYSTEM

(71) Applicant: TBuck Global, LLC, Pasadena, CA (US)

(72) Inventors: Thomas K. Buck, Pasadena, CA (US); Dale Woiken, Upland, CA (US)

(73) Assignee: TBUCK GLOBAL, LLC, Pasadena, CA (US)

( * ) Notice: Subject to any disclaimer, the term of this patent is extended or adjusted under 35 U.S.C. 154(b) by 159 days.

(21) Appl. No.: 18/784,421

(22) Filed: Jul. 25, 2024

(65) Prior Publication Data

US 2025/0033873 A1 Jan. 30, 2025

Related U.S. Application Data

(60) Provisional application No. 63/515,713, filed on Jul. 26, 2023.

(51) Int. Cl.
*B65F 1/14* (2006.01)
*B65F 1/06* (2006.01)
*B65F 1/16* (2006.01)

(52) U.S. Cl.
CPC .................. *B65F 1/06* (2013.01); *B65F 1/14* (2013.01); *B65F 2001/061* (2013.01); *B65F 2001/1653* (2013.01)

(58) Field of Classification Search
CPC ................ B65F 1/14; B65F 2001/1653; B65F 2001/061; B65F 1/06; B65F 1/1415
See application file for complete search history.

(56) References Cited

U.S. PATENT DOCUMENTS

| | | | | | |
|---|---|---|---|---|---|
| 5,836,553 | A * | 11/1998 | Bergaila | B65F 1/1415 248/101 |
| 10,131,498 | B1 * | 11/2018 | Schairbaum | B65F 1/1646 |
| 2020/0087062 | A1 * | 3/2020 | Buck | B65F 1/06 |
| 2022/0194698 | A1 * | 6/2022 | Foster | B65F 1/1615 |

FOREIGN PATENT DOCUMENTS

| | | |
|---|---|---|
| CA | 3 112 725 A1 | 3/2020 |
| DE | 8812557 U1 | 11/1988 |

OTHER PUBLICATIONS

Extended European Search Report for Application No. 24190920.9, dated Feb. 13, 2025, 9 pages.

* cited by examiner

*Primary Examiner* — Stephen J Castellano
(74) *Attorney, Agent, or Firm* — Womble Bond Dickinson (US) LLP

(57) ABSTRACT

A receptacle assembly configured to accommodate a bag includes a ring or a lid, and a bin or a crown including at least one wall defining an interior space, a mouth in communication with the interior space, and a rim proximate to the mouth. The rim includes at least one lip and at least one structure. At least a portion of the structure is at an elevation below the at least one lip. When the receptacle assembly is assembled, a rim-space is defined between the at least one wall and a peripheral portion of the receptacle assembly, and the structure extends into the rim-space. The peripheral portion of the receptacle assembly includes a peripheral portion of the ring or the lid. The rim-space is configured to accommodate an edge and a border of the bag.

21 Claims, 17 Drawing Sheets

FIG. 15
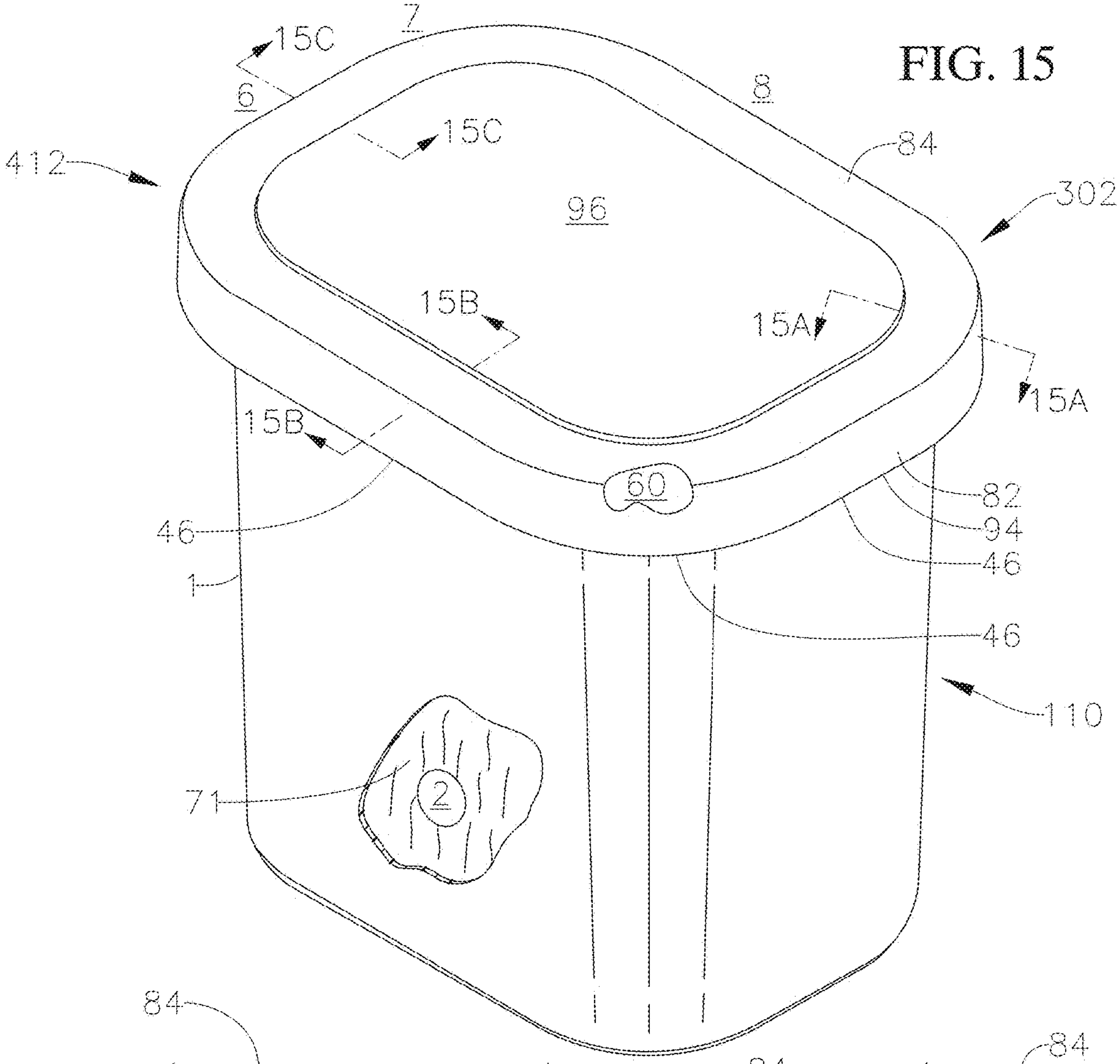
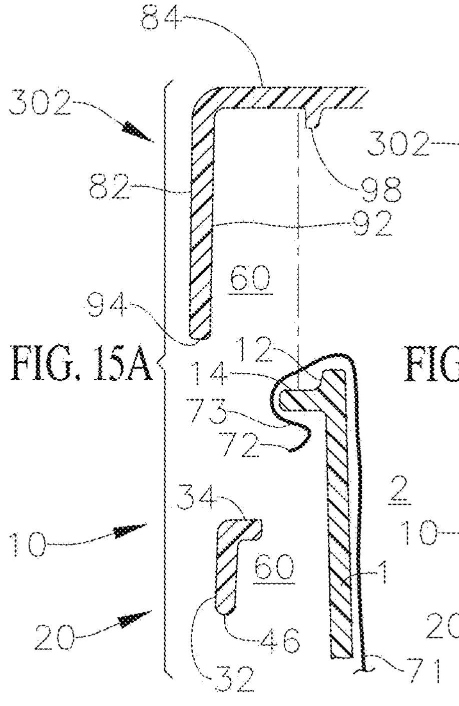
FIG. 15A
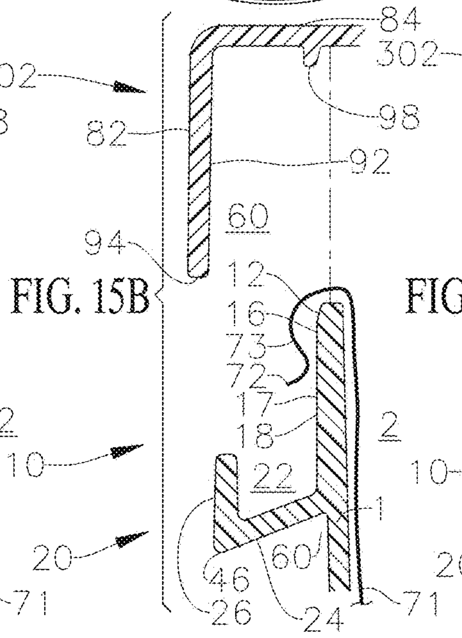
FIG. 15B
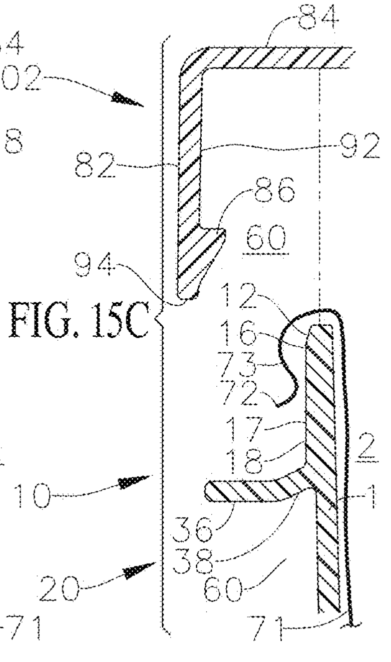
FIG. 15C

RECEPTACLE-ASSEMBLY RIM SYSTEM

CROSS-REFERENCE TO RELATED APPLICATION

The present application claims priority to and the benefit of U.S. Provisional Application No. 63/515,713, filed Jul. 26, 2023, the entire content of which is incorporated herein by reference.

BACKGROUND

1. Field

The present disclosure relates generally to receptacle assemblies, including bin assemblies and crown assemblies, where the receptacle assemblies are used for collection of materials and items including waste, recycling, composting and reusables.

2. Description of the Related Art

The present disclosure relates generally to a receptacle assembly that is used for collecting and storing items, including waste, recycling, composting and reusables, and that is equipped with a rim system that secures and conceals the edge and border of variously sized and shaped bags.

The rim areas of many related-art receptacles are designed so that the means of installing a bag or liner, including draping the bag over the receptacle's rim or securing the bag at the receptacle's exterior, leave an unattractive edge and border of the bag exposed and detract from the receptacle's appeal.

Some related-art receptacles are configured for lining with a bag of a specified size and source. Such receptacles do not permit neat lining with a broad range of bag sizes and sources-including as bags previously used to purchase or transport of goods—thus increasing costs to users and the environment.

Some related-art receptacle assemblies include a removable ring within the mouth of the receptacle so that the edge and border of the liner can be wrapped over the ring and stored within the receptacle's interior. Such installation can be cumbersome and time-consuming, and emptying typically requires removing the ring and detaching the liner, which may be cumbersome, unsanitary and, in discouraging liner reuse, wasteful.

Some related-art receptacles have a ring, lid or container that slips over the upper portion or entirety of the receptacle and conceals the edge and border of a liner that is draped over the receptacle's rim. These receptacle assemblies do not provide for the easy and efficient attachment of a liner in close proximity to the receptacle's rim, the efficient use of materials in concealing the liner's edge and border, or the easy handling and sanitary emptying with the over-fitting ring, lid or container in place.

Some related-art receptacle assemblies include lids that attach to the rim and secure the liner but are not configured to conceal the liner's edge and border, to permit easy lid removal with the liner in place, or to promote easy, sanitary emptying and liner reuse.

Some related-art receptacles have multiple compartments for multi-stream use, thus allowing users convenient choices. While often allowing users to conveniently separate recycling or composting from trash, these receptacles are generally costly and do not significantly reduce materials or facilitate easy handling, repurposing bags, or liner reuse.

The above information disclosed in this Background section is only for the enhancement of the understanding of the background of the invention and therefore it may contain information that does not constitute prior art.

SUMMARY

The present disclosure relates to various embodiments of a receptacle assembly. The receptacle assembly includes one of a ring and a lid, where the ring includes an inner edge. The receptacle assembly also includes one of a bin and a crown, where both the bin and the crown include at least one wall defining an interior space (the bin includes a bottom, and crown does not) and a rim configured to receive the edge and border of a bag. The rim includes at least one lip and at least one structure joining the at least one wall below the elevation of the at least one lip. The receptacle assembly includes a rim-space that surrounds the interior space and is defined by the least one wall and the receptacle assembly's periphery, which includes the peripheral portion of the one of a ring and a lid. The contents of the rim-space include at least a portion of the at least one structure.

The mouth of the receptacle assembly may be essentially rectangular, circular, oval or any other suitable shape, and the interior space of a receptacle assembly may permit identical receptacle assemblies to nest.

The one of a ring and a lid may removably attach to the one of a bin and a crown, and the attachment means may include a latch, a friction fit or any other suitable means, including a hinge. Alternatively, the one of a ring and a lid may slide on and off the one of a bin and a crown without attachment.

The receptacle assembly permits installation of a bag that lines the at least one wall defining the interior space of the one of a bin and a crown. The one of a ring and a lid secure and conceal the edge and border of bags, including variously sized and shaped bags, including repurposed bags.

Where a bag is installed and secured in a crown, the bag is suspended from the crown. The crown of the receptacle assembly may include attachment means that that permit attachment of the crown to a receptacle that includes a bottom and is composed of metal, wood, cloth, or other rigid or flexible materials. Where not attached to a rigid receptacle, the crown may rest (unattached) on a rigid receptacle or on a wall mount, rack or other apparatus. The crown of a receptacle assembly may be used in single-stream or multi-stream units.

The at least one structure may include one or more handles, pockets, floors, ledges, ribs, bridges, guides, risers, openings and other features.

The configuration of lids may vary, and both lids and rings may differ in color, writings, graphics or other indicia of receptacle contents. The variability and interchangeability of lids and rings and the concealed attachment of bags across a broad range of bag sizes and sources invites consumers to tailor receptacle assemblies and repurpose bags for varied collection needs, including trash, recycling, composting, and reusables.

This summary is provided to introduce a selection of concepts that are further described below in the detailed description. This summary is not intended to identify key or essential features of the claimed subject matter, nor is it intended to be used in limiting the scope of the claimed subject matter.

BRIEF DESCRIPTION OF THE DRAWINGS

The features and advantages of embodiments of the present disclosure will be better understood by reference to the following detailed description when considered in conjunction with the accompanying figures. In the figures, like reference numerals are used throughout the figures to reference like features and components. The figures are not necessarily drawn to scale.

FIG. 15 is an isometric view of the bin-lid assembly of the first embodiment with a fully installed bag;

FIG. 15A is an exploded cross section of an upper portion of a corner the assembly and the installed bag shown in FIG. 15;

FIG. 15B is an exploded cross section of an upper portion of a side of the assembly and the installed bag shown in FIG. 15;

FIG. 15C is an exploded cross section of an upper portion of an end of the assembly and the installed bag shown in FIG. 15;

DETAILED DESCRIPTION

The present disclosure is directed to various embodiments of a receptacle assembly that includes at least two components and permits installation of a bag. The first component is either a bin or a crown, each of which includes a rim that facilitates installation of a bag. In all embodiments the rim includes at least one lip and at least one structure extending outward from the at least one wall. For bins, the bag may serve as a liner. For crowns, the sides of the bag hang from the crown, which may be supported by a wall mount, stand, container, receptacle, rack or any other suitable support. The crown of the receptacle assembly may also include attachment means that that permit attachment of the crown to a container that includes a bottom and is composed of metal, wood, cloth, or other rigid or flexible materials. The second component is either a ring or a lid, each of which fits over the rim of the first component and conceals the edge and border of the bag. The receptacle assembly of the present disclosure may be used for collecting various materials or items such as, for example, waste, recycling, composting, and reusables.

Figure 1:
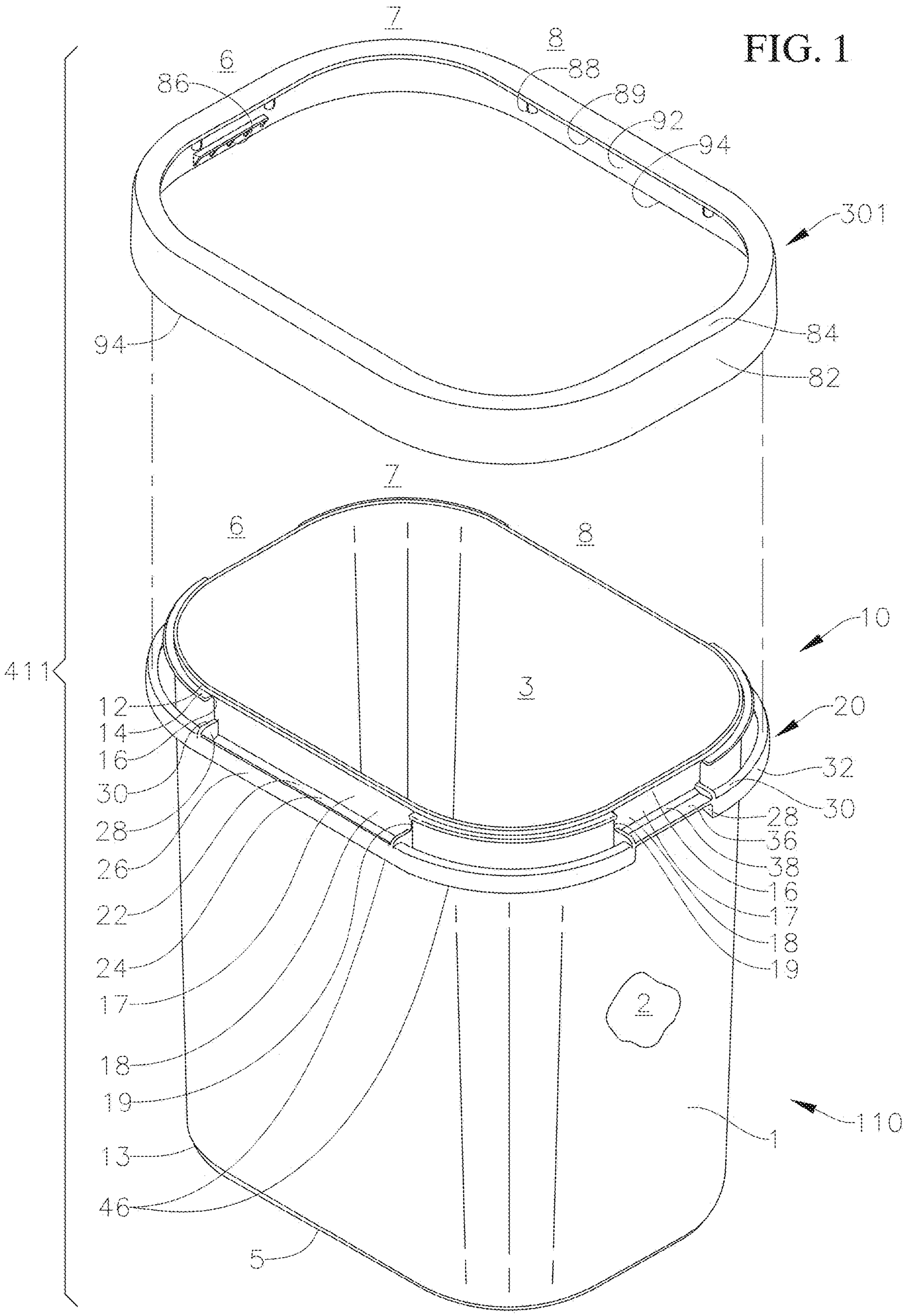
FIG. 1 is an exploded isometric view of the bin-ring assembly of the first embodiment.
Figure 4:
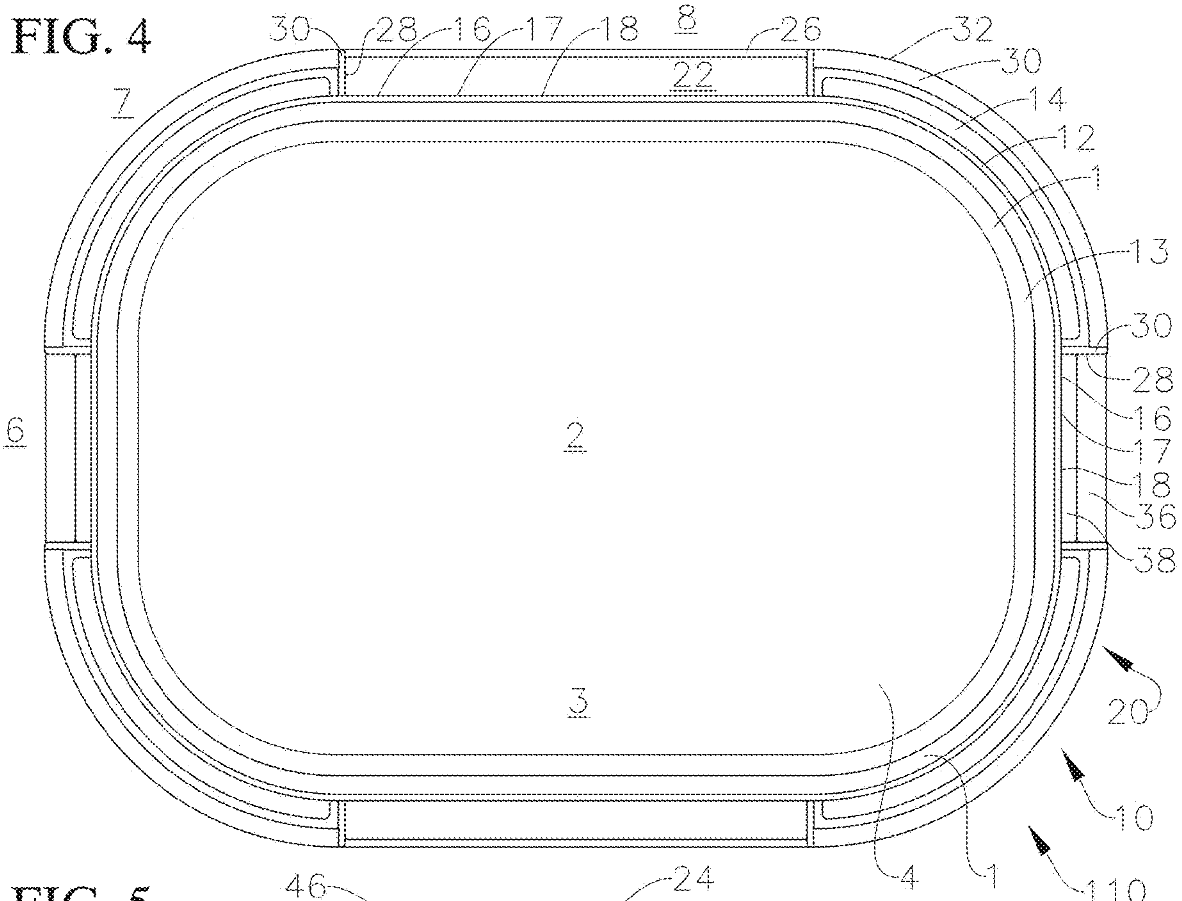
FIG. 4 is top view the upper portion of the bin of the first embodiment.
Figure 5:
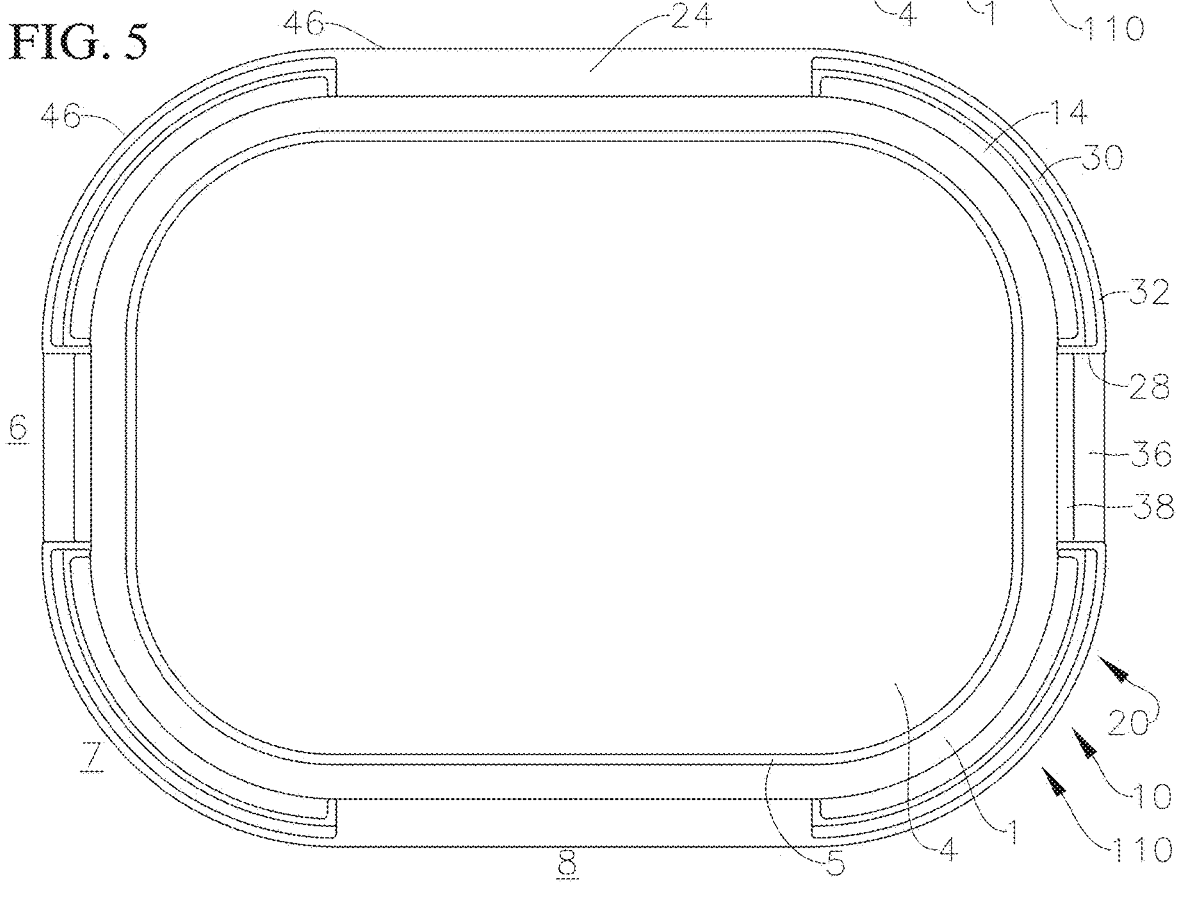
FIG. 5 is a bottom view of the bin of the first embodiment.
Figure 8:
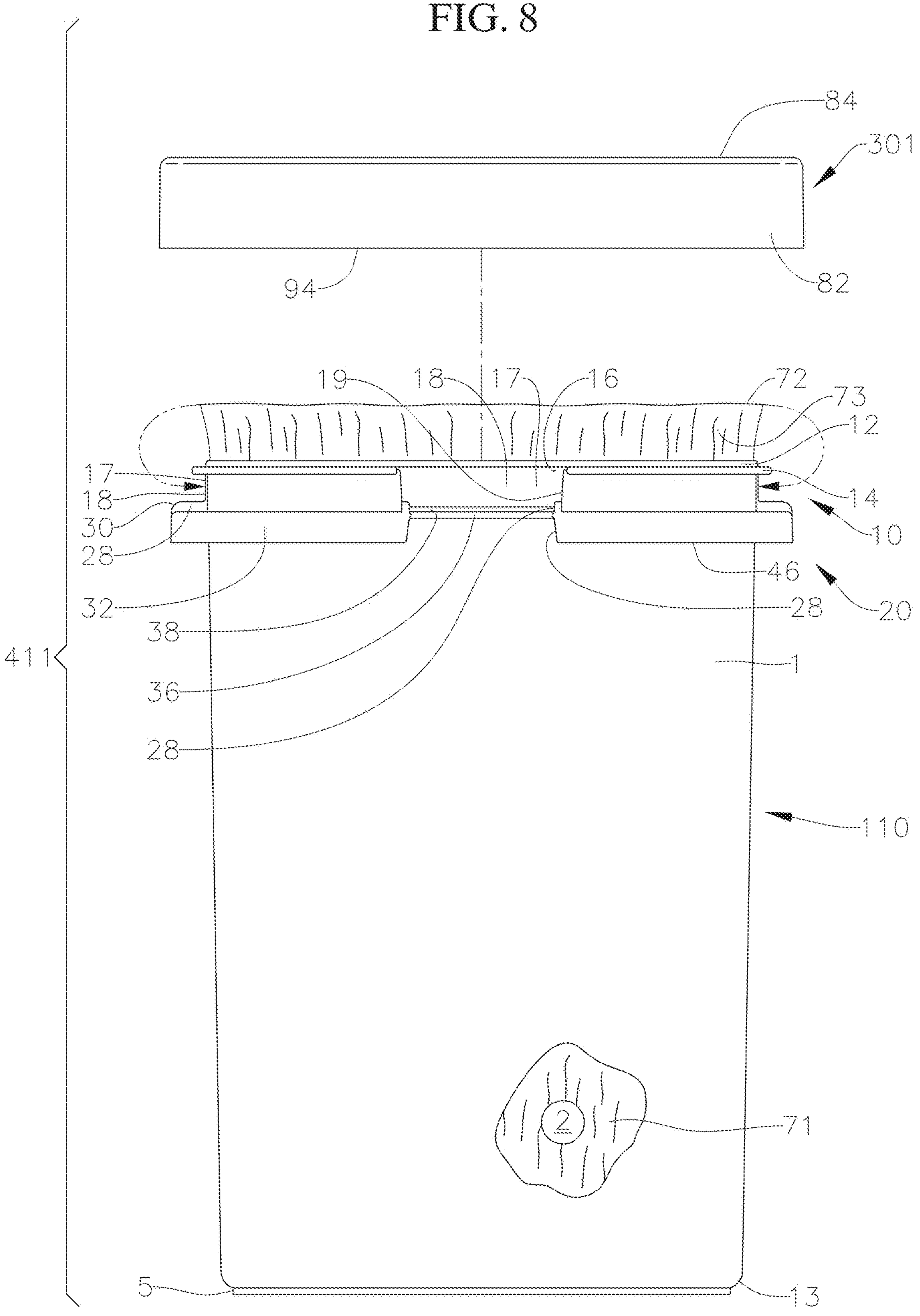
FIG. 8 is an exploded side view of the bin-ring assembly of the first embodiment in which a bag has been partially installed in the bin.
Figure 9:
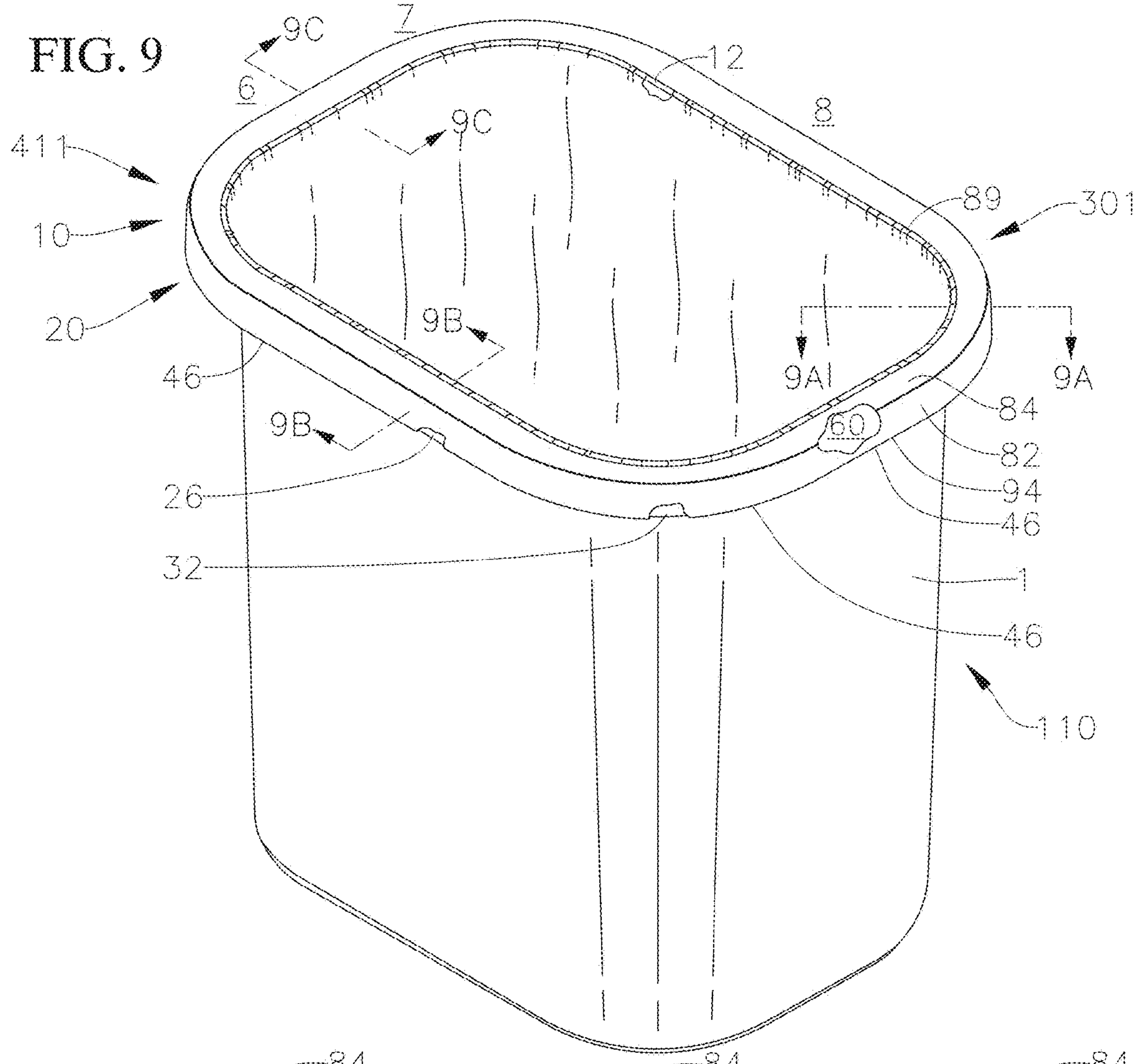
FIG. 9 is an isometric view of the bin-ring assembly of the first embodiment with a fully installed bag.

With reference now to FIGS. 1 through 15, the first embodiment of the receptacle assembly includes a bin 110, a ring 301 and a lid 302. FIGS. 1, 9 and 15. The bin 110, the ring 301, the lid 302, the bin-ring assembly 411 and the bin-lid assembly 412 each have two ends 6, four corners 7, and two sides 8. FIGS. 1, 6, 7, 9, 13, 14 and 15. The bin 110 includes a wall 1, an interior space 2, a mouth 3, a footing 5 that surrounds a bottom 4, and coving 13 that, immediately above the footing 5, is part of the wall 1. FIGS. 1, 4, 5. The upper portion of the bin 110 includes a rim 10, that includes the upper portion of the wall 1, four lips 14 that extend outward from the wall 1, four gaps 16 that separate the lips 14, and a barrier 12 that surrounds and defines the mouth 3 at the top of the wall 1. FIGS. 1, 2, 3, 4 and 5. The lips 14, found at each of the four corners 7, can take various forms, including those shown in FIGS. 2, 2A, 2B and 2C. The rim 10 also includes a structure 20 that extends outward from, and surrounds, the wall 1. FIGS. 1, 2, 3, 4 and 5.

The structure 20 includes two ledges 36, two pockets 22, four bridges 32 and eight ribs 28. FIGS. 1, 2, 3 and 4. At each end 6 of the bin 110, two ribs 28 join a ledge 36 and a connector 38. The ribs 28 and connector 38 attach to the wall 1. FIGS. 1, 2, 3, 5 and 8. At each side 8, two ribs 28 and a floor 24 join the wall 1 and a riser 26 in forming a pocket 22. FIGS. 1, 2, 2A, 4 and 5. A bridge 32 spans the corner 7 and joins a rib 28 at side 8 and another rib 28 at end 6. FIGS. 1, 2, 3, 4 and 5. At the ends 6 and sides 8, above the wall 1's junctions with the connectors 38, floors 24 and ribs 28, the wall 1 has a double-taper 18: in the areas 17, bordered by ridges 19, the wall 1 is tapered on both its exterior and interior sides. FIGS. 2, 2A, 3, 8, 9B, 9C, 10, 15B, 15C. At the corners 7 and sides 8, the structure 20 forms a handle 46, permitting grasping, lifting and overturning the bin 110. FIGS. 1, 2, 2A, 3, 5, 8.

The top edge of each rib 28 forms a guide 30 which, like its rib 28, extends to the wall 1. FIGS. 1, 2, 2A, 4 and 5. The top of each bridge 32 similarly forms a guide 30 that extends inward toward the wall 1 but, unlike the guides 30 at the top of the ribs 28, the guides 30 at the top of the bridges 32 do not reach the wall 1. FIGS. 1, 4 and 5. All guides 30 help guide the bag-edge 72 and bag-border 73 in the installation of a bag 71. FIGS. 1, 4 and 8.

Installing a bag 71 in the bin 110 begins by placing the bag 71 in the interior space 2 of the bin 110 so that the bag 71 lines the wall 1 and bottom 4 and the bag-edge 72 and bag-border 73 extend above the barrier 12. FIGS. 1 and 8. The bag-edge 72 and the bag-border 73 are then looped over the barrier 12 and the lips 14 and inserted below the four lips 14 and above the guides 30 of the structure 20. FIGS. 1 and 8.

Figure 9A:
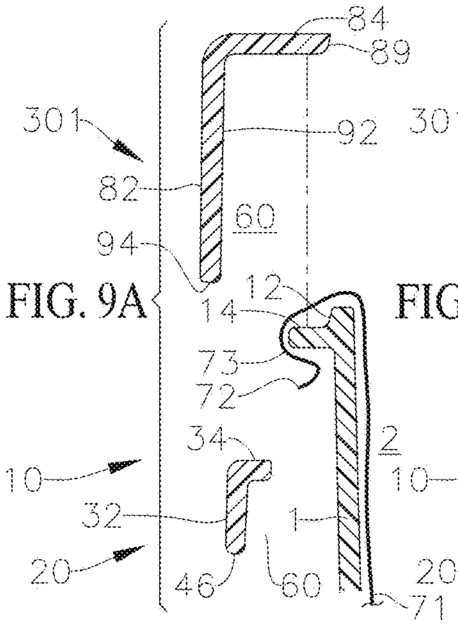
FIG. 9A is an exploded cross section of an upper portion of a corner the assembly and installed bag shown in FIG. 9.
Figure 9B:
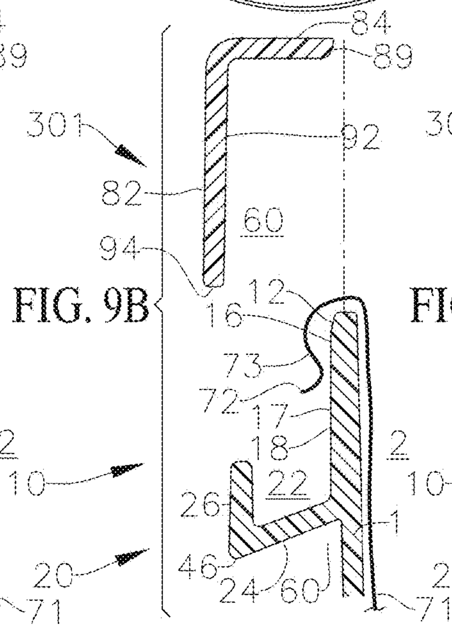
FIG. 9B is an exploded cross section of an upper portion of the side of the assembly and installed bag shown in FIG. 9.
Figure 9C:
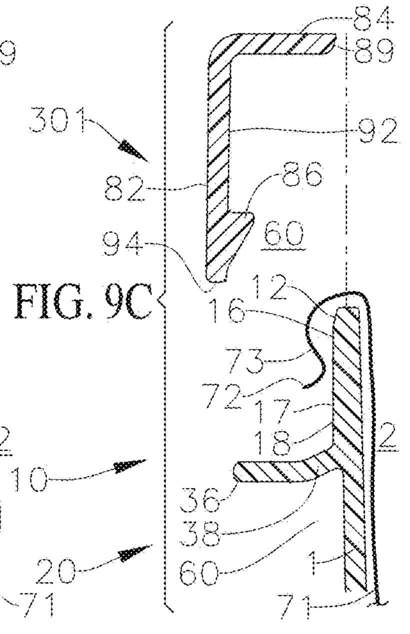
FIG. 9C is an exploded cross section of the upper portion of the end of the assembly and installed bag shown in FIG. 9.
Figure 12:
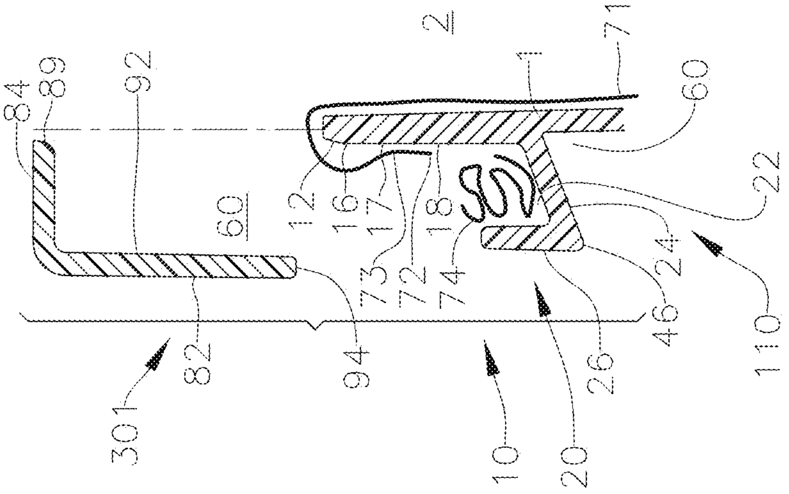
FIG. 12 is the same exploded cross section as FIG. 10 but in which the bag has been cinched and its excess stuffed.
Figure 11:
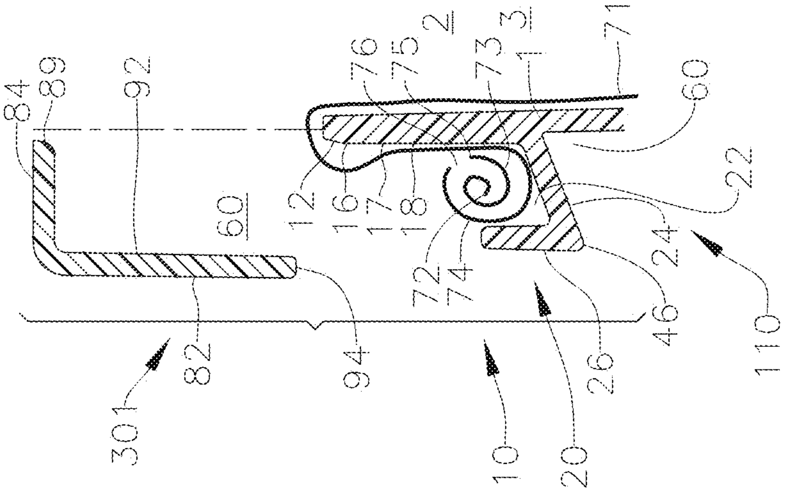
FIG. 11 is the same exploded cross section as FIG. 10 but in which a bag with handles has been installed.
Figure 10:
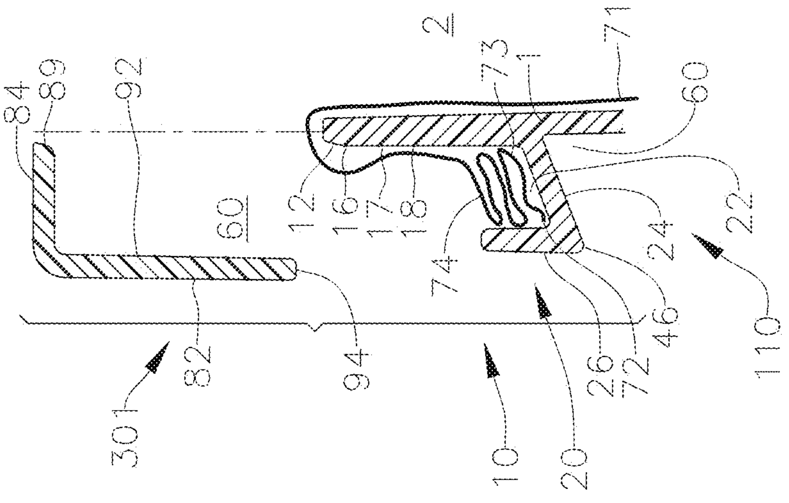
FIG. 10 is an exploded cross section of an upper portion of the side of the assembly shown in FIG. 9 but in which a larger bag has been installed.

The pockets 22 help in attaching a broad range of bags 71, including repurposed bags 71 of various sizes and shapes. If a bag 71 fits the rim 10 too loosely, bag-excess 74 may be stored in one or both pockets 22. FIGS. 10, 11 and 12. The bag-excess 74 may be gathered and stuffed directly into a pocket 22. FIG. 10. When a bag 71, such as a retail checkout bag, falls within a broad range of bag sizes and has two opposing grips, each consisting of a loop 75 above a hole 76, each loop 75 may be rolled, along with other excess-bag 74, and stuffed into a pocket 22. FIG. 11. Alternatively, the bag-edge 72 and bag-border 73 may be pulled tightly against the wall 1, cinched by hand, and the bag-excess 74 gathered and stuffed, or twisted and stuffed, into a pocket 22. FIG. 12. By blocking downward or outward escape of portions of the bag 71, the structure 20—including its pockets 22, floors 24, risers 26, ribs 28, ledges 36, and connectors 38—helps contain the bag-edge 72, bag-border 73, and bag-excess 74 and complete the initial attachment of the bag 71. FIGS. 1, 2, 2A, 3, 4, 5, 8, 9, 9A, 9B, 9C, 10, 11 and 12.

Figure 6:
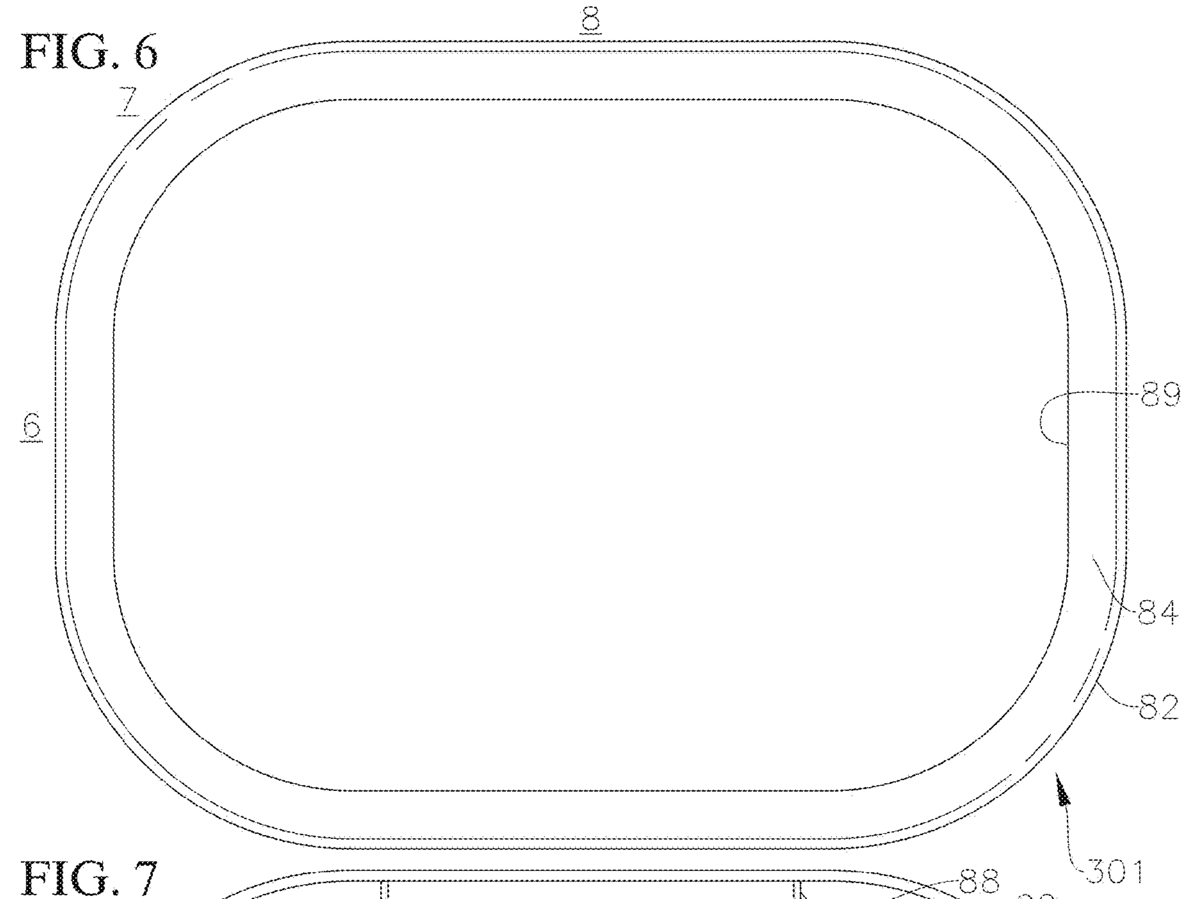
FIG. 6 is a top view of the ring of the first embodiment.
Figure 7:
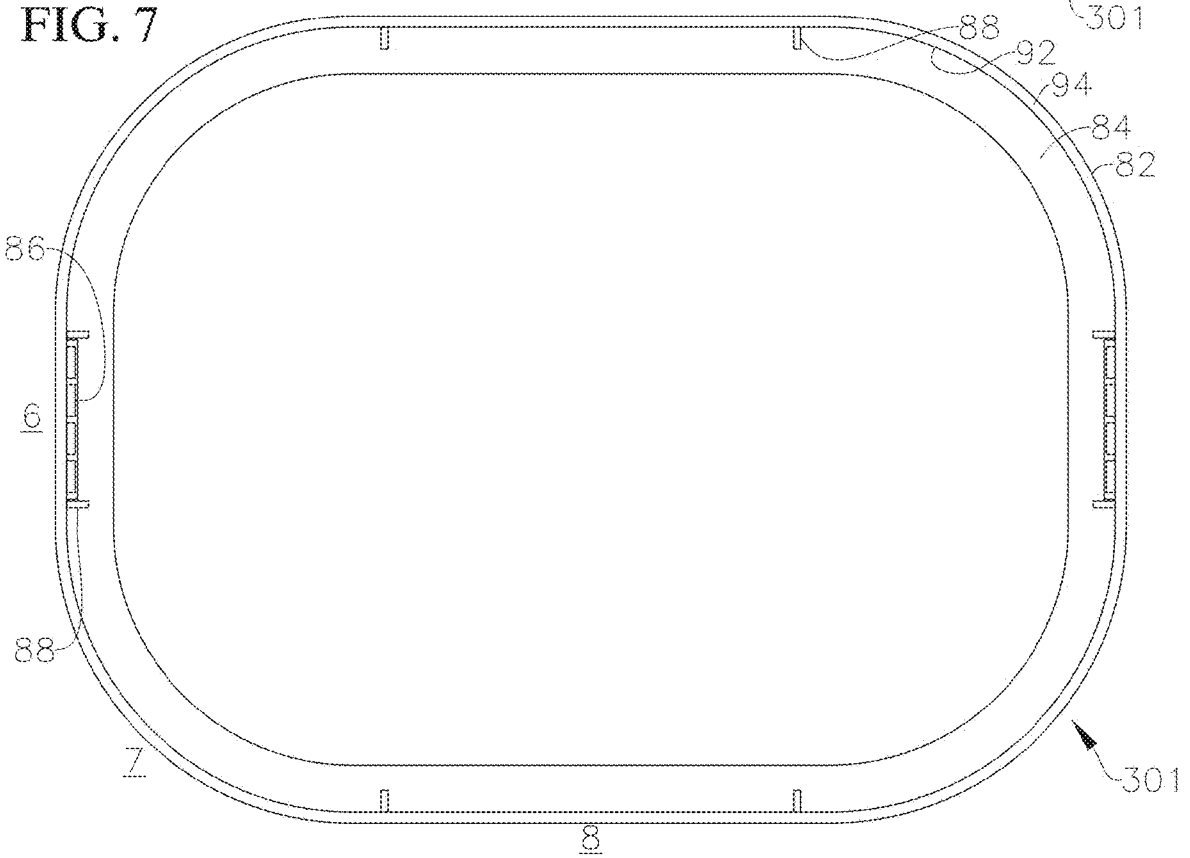
FIG. 7 is a bottom view of the ring of the first embodiment.

In the first embodiment, completion of the installation of a bag 71 requires the engagement of a ring 301 or a lid 302. The ring 301 includes a face 82, a cover 84, two latches 86, eight braces 88, an inner-edge 89, an inner-face 92, and a bottom-edge 94. FIGS. 1, 6 and 7. When the ring 301 is correctly placed over the rim 10 of an upright-standing bin 110, appropriate downward forces on the cover 84 at the ends 6 engage the two latches 86 with the two ledges 36 of the bin 110. FIGS. 1, 4, 5, 6, 7, 8, 9 and 9C. When the ring 301 is engaged with a bin 110 in which a bag 71 has been attached, the cover 84 is flush with the barrier 12, portions of the bag 71 are clamped between the cover 84 and the lips 14 and between the barrier 12 and the inner-edge 89. Additionally, when the receptacle assembly is assembled (e.g., when the ring 301 or the lid 302 is engaged with the bin 110 to form the bin-ring assembly 411 or the bin-lid assembly 412), a rim-space 60 is defined between the wall 1 and a peripheral portion of the receptacle assembly that includes a peripheral portion of the ring 301 (or the lid 302) (e.g., the rim-space 60 is formed between the wall 1 of the bin 110 and the face 82 of the ring 301 (or the lid 302)). The rim-space 60 surrounds the interior space 2 of the bin 110. In one or more embodiments, the rim-space 60 may be a continuous ring-shaped space. The structure 20, the bag-edge 72, the bag-border 73 and any bag-excess 74 are contained within the rim-space 60. FIGS. 6, 7, 9, 9A, 9B, 9C, 10, 11 and 12. With a bag 71 thus installed, the bin-ring assembly 411 can receive deposits and can be overturned and emptied: the clamping action secures the bag 71, and both the barrier 12 and its over-draped bag 71 shield the ring 301's inner-edge 89 from trash or other deposits flowing in or out of the mouth 3. FIGS. 9, 9A, 9B, 9C, 10, 11 and 12.

When ring 301 is engaged with the rim 10, the elevation of the engaged ring's bottom-edge 94 coincides with the elevation of the adjacent bottom edges of the riser 26 and bridge 32, thus effectively broadening the handles 46 at the sides 8 and corners 7. FIGS. 9, 9A and 9B. At the ends 6, the bottom-edge 94 extends below the ledges 36, allowing manual disengagement of the opposing latches 86, removal of the ring 301 from the bin 110, and removal of the bag 71. FIGS. 8, 9, 9A, 9B, 9C, 10A, 10B, and 10C. The ring 301 may be removed from the bin 110 in order to remove a bag and its contents for transporting to a pick-up or drop-off location, to replace a bag 71 with another bag 71, to replace the ring 301 with another ring 301 or to replace a ring 301 with a lid 302. FIGS. 6, 8, 9, 13 and 15. Although the ends 6 of the first embodiment are identical, one end 6 may be reconfigured to include a hinge that also permits removable attachment of a reciprocally reconfigured rings 301 and lids 302.

In the first embodiment, as in all other embodiments, the ring 301 and lid 302, are interchangeable and can each be produced in varied colors and with varied writings, graphics or other indicia of receptacle contents. FIGS. 6, 7, 13 and 15. Like the ring 301, the lid 302 of the first embodiment includes a face 82, eight braces 88, an inner-face 92 a bottom-edge 94 and latches 86, and the lid 302 engages and disengages with the bin 310, and effectively broadens the handles 46, in the same manner as the ring 301. FIGS. 1, 6, 7, 8, 9, 90, 13, 14 and 15.

Like the ring 301, the lid 302 also includes a cover 84 but the lid 302's cover 84 extends further inward than the cover

Figure 13:
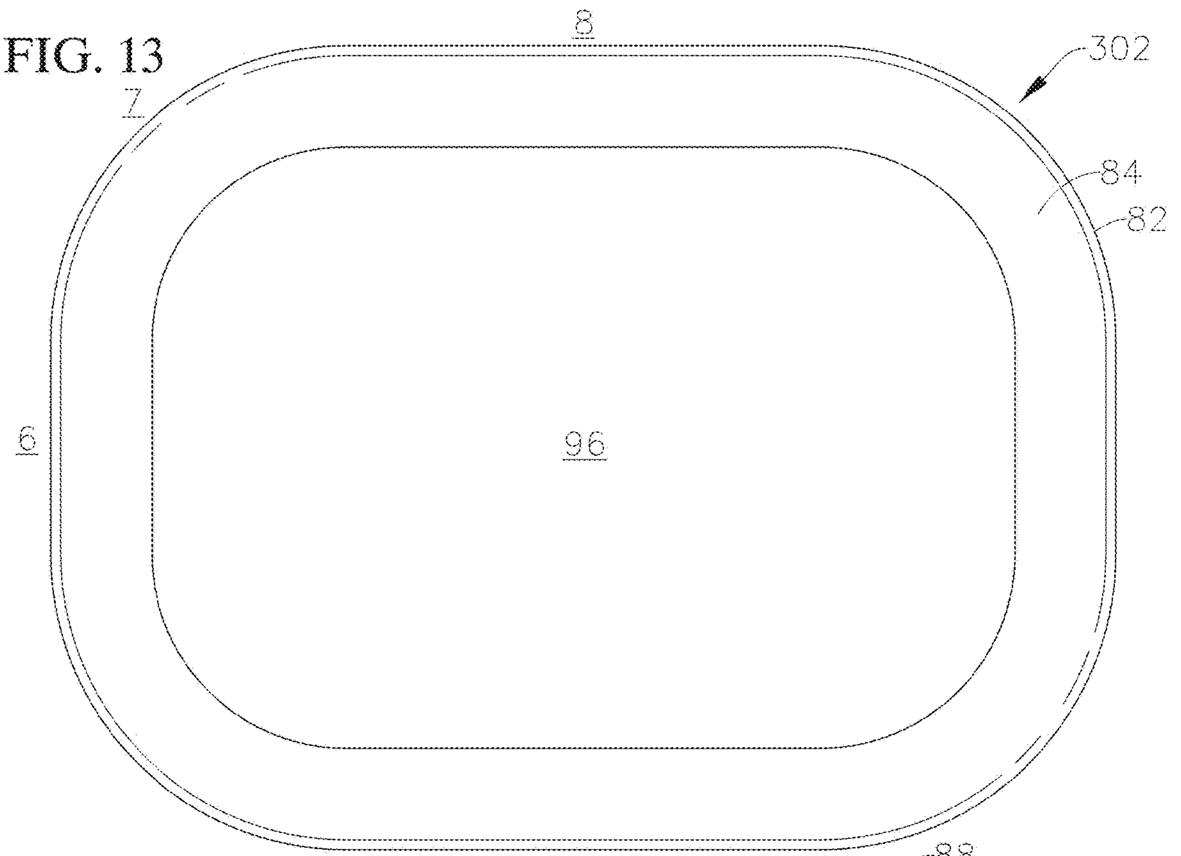
FIG. 13 is a top view of the lid of the first embodiment.

84 of the ring 301 and, unlike the ring 301, the lid 302 does not have inner-edge. FIGS. 6 and 13. The cover 84 of the lid 302 joins the cap 96, which is elevated relative to the cover 84 and fits snuggly within the footing 5 of a bin 110, permitting fitted stacking of multiple bin-lid assemblies 412 or of a bin-ring assembly 411 on top of a bin-lid assembly 412. FIGS. 1, 5, 9, 13, 14, 15.

Figure 14:
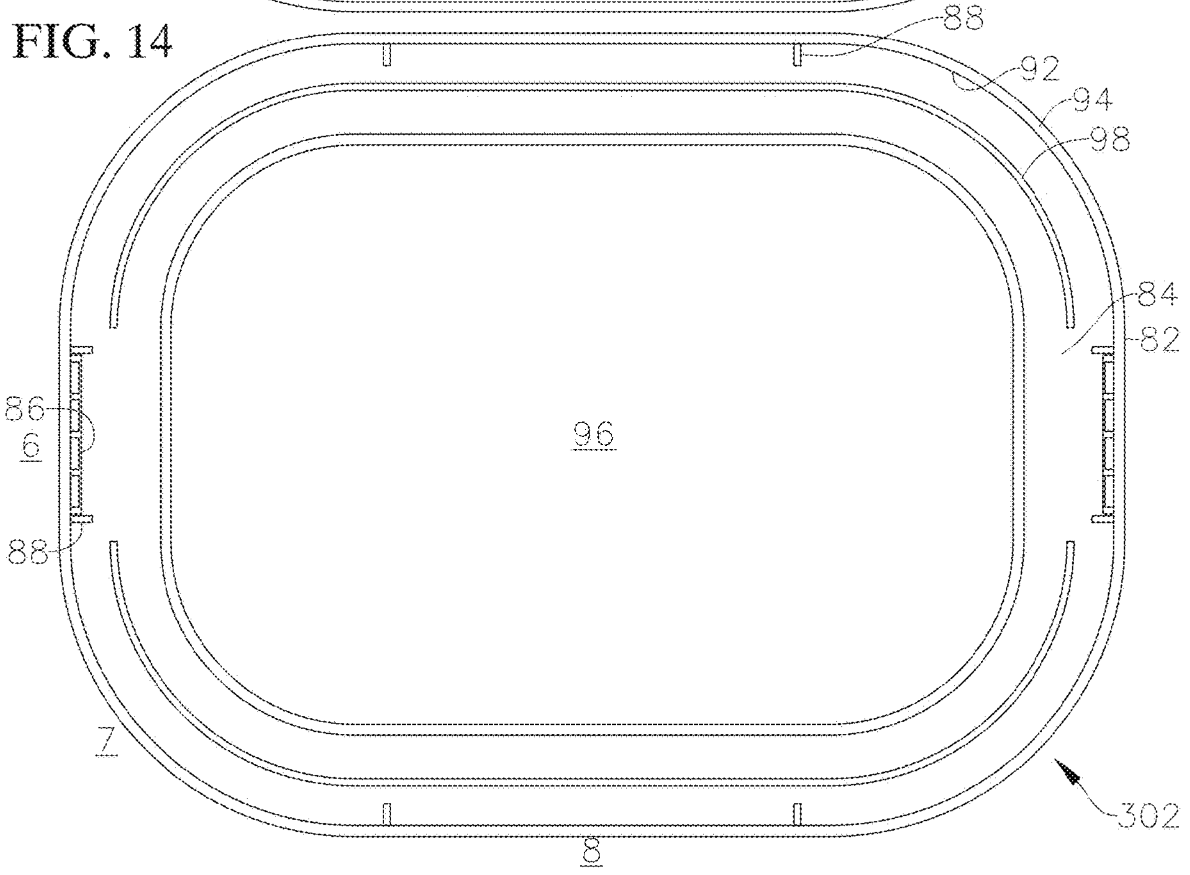
FIG. 14 is a bottom view of the lid of the first embodiment.

On the underside of the cover 84 of the lid 302 of the first embodiment, two protrusions 98 extend downward through the corners 7 and sides 8. FIG. 14. When the lid 302 of the first embodiment is engaged with the bin 110, the cover 84 is clamped against the top the barrier 12, and the protrusions 98 are clamped against the top of the lips 14 and the outward-facing side of the barrier 12. FIGS. 15, 15A, 15B and 15C. When the lid 302 of the first embodiment is engaged with a bin 110 with a bag 71 in place, this clamping action secures the bag 71, and the bag-edge 72, bag-border 73, and any bag-excess 74 and structure 20 are contained within the rim-space 60. FIGS. 15, 15A, 15B and 15C; see FIGS. 10, 11, 12. The lid 302 may be removed to add, remove, or empty contents of the bin 110, to remove a bag 71 and its contents for transporting to a pick-up or drop-off location, to remove or replace a bag 71, to replace the lid 302 with another lid 302 or to replace a lid 302 with a ring 301. FIGS. 6, 8, 9, 13 and 15.

Figure 16:
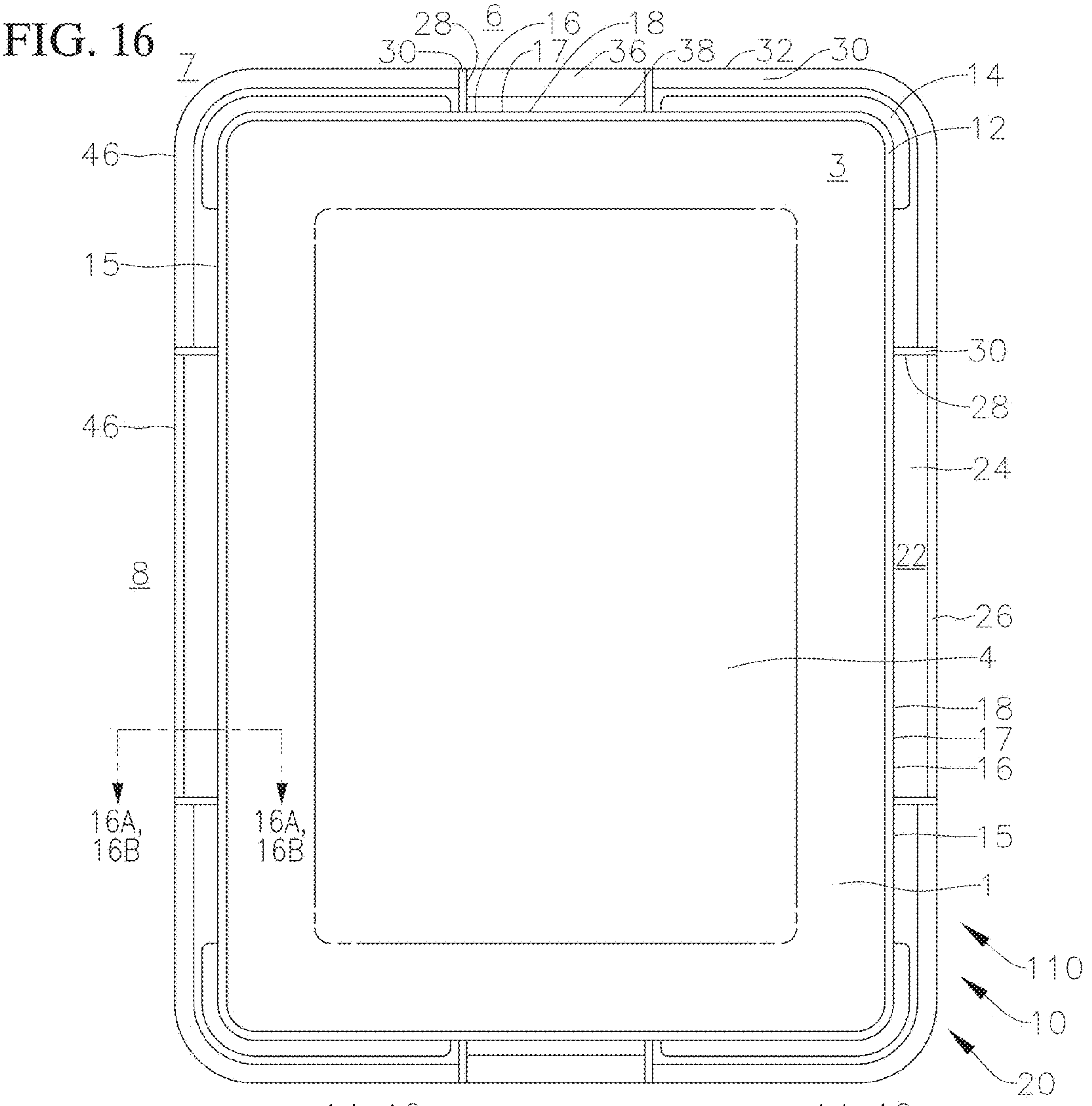
FIG. 16 is a top view of the bin of the second embodiment.
Figure 16A:
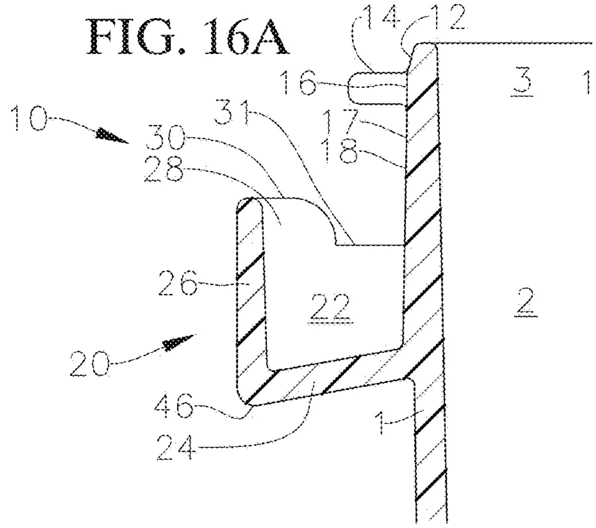
FIG. 16A is a cross section of an upper portion of a side pocket of the bin shown in FIG. 16.
Figure 16B:
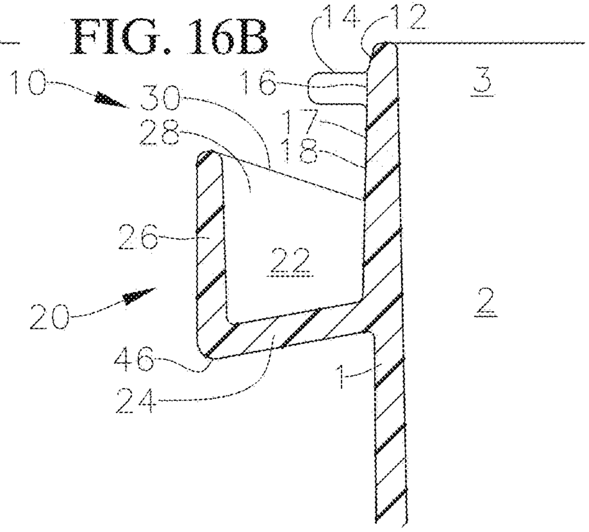
FIG. 16B is a cross section of an upper portion of an alternative side pocket of the bin shown in FIG. 16.
Figure 17:
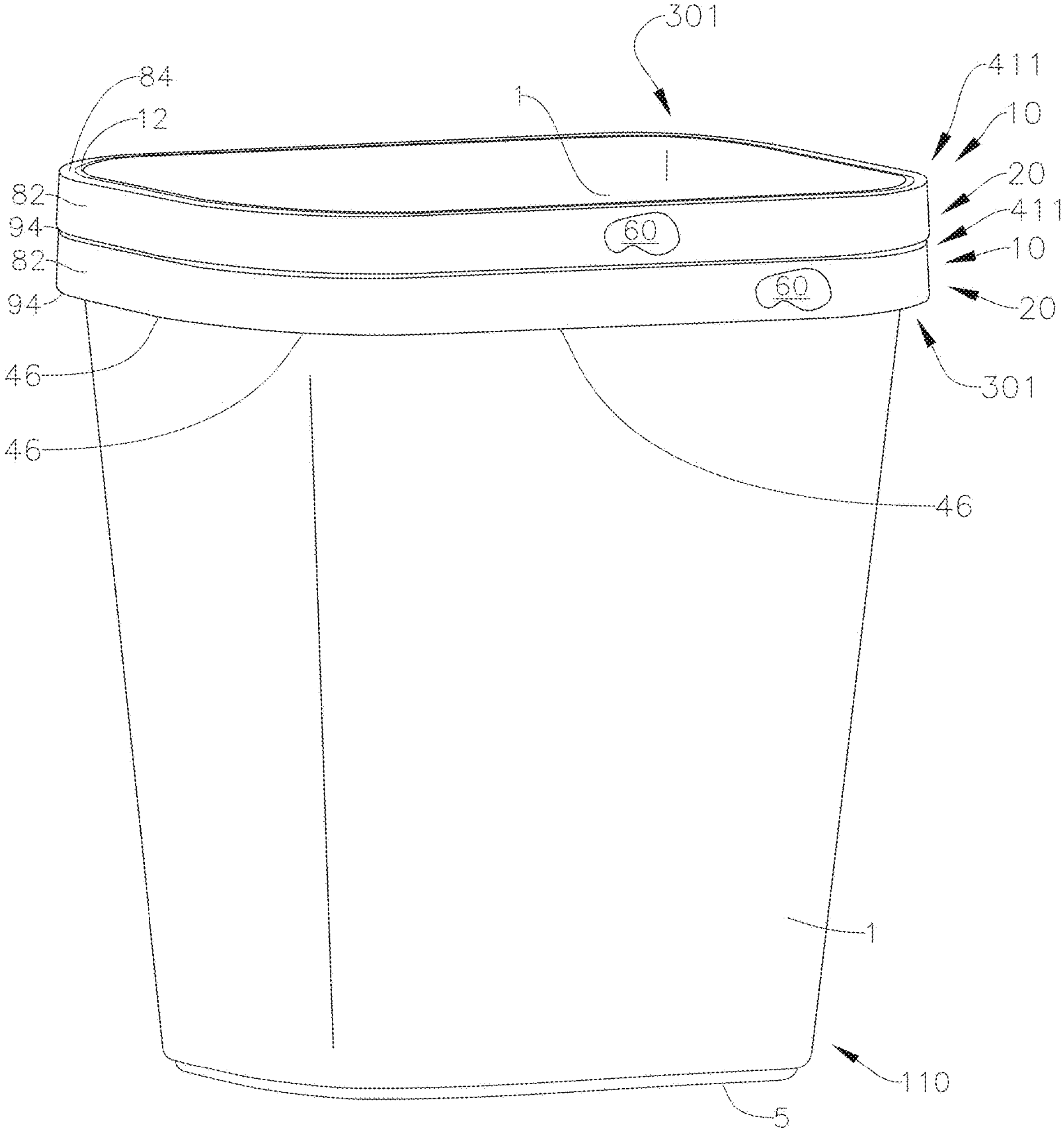
FIG. 17 is an isometric view of two bin-ring assemblies of the second embodiment in which one assembly is nested in the other.

The second embodiment of the receptacle assembly, shown in FIGS. 16, 16A, 16B and 17, includes a bin 110 with a mouth 3 in which the corners 7 have a radius much smaller than the radius of the corners 7 of the mouth 3 of the first embodiment, so that the overall appearance of the mouth 3 of the second embodiment is essentially rectangular. FIGS. 1, 16. As in the first embodiment, the ring 301 (and lid 302) engages with the bin 110 by latching. FIGS. 16, 17. Unlike the lips 14 of the first embodiment, the lips 14 extend beyond the corners 7 through portions of the adjacent straight ends 6 and straight sides 8, and at side 8 the gap 16 between two lips 14 extends significantly beyond the pocket 22, creating at each side 8 two zones 15 immediately outside the pocket 22. FIG. 16. The zones 15 provide additional room for pulling and cinching the bag-edge 72 and bag-border 73 of a bag 71 and extending and twisting the bag-excess 74 before inserting the bag-excess 74 into the adjacent pocket 22. FIG. 16.

Figure 2:
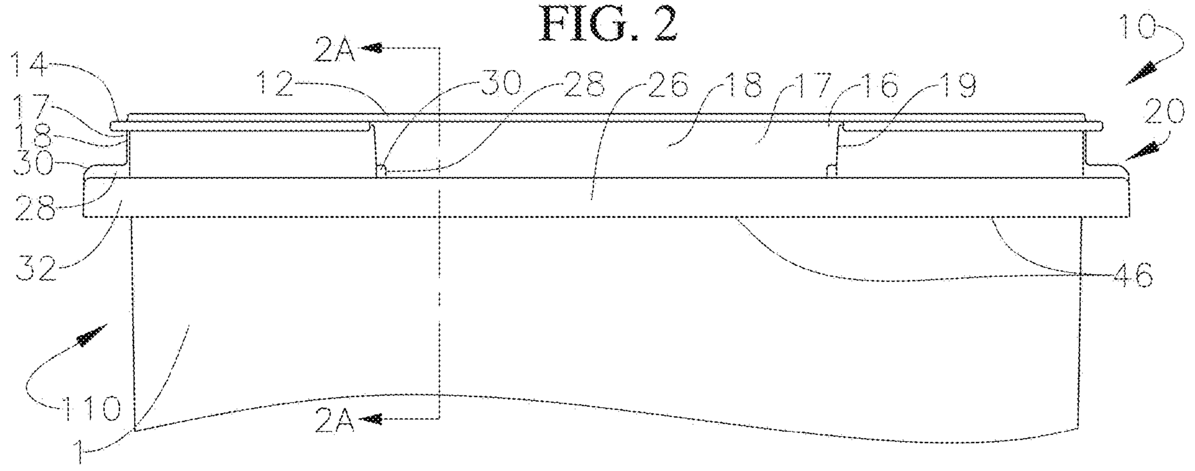
FIG. 2 is a side view of the upper portion of the bin of the first embodiment.
Figure 2A:
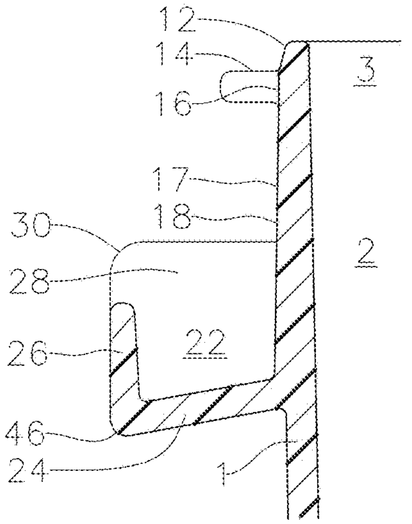
FIG. 2A is a cross section of the upper portion of the bin shown in FIG. 2.
Figure 2B:
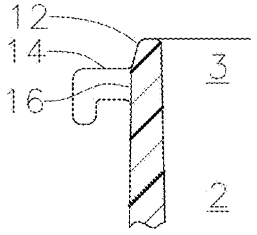
FIG. 2B is the top portion of FIG. 2A with an alternative lip.
Figure 2C:
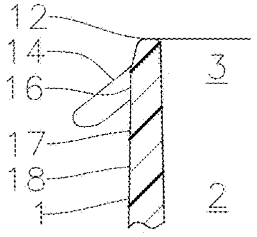
FIG. 2C is the top portion of FIG. 2A with another alternative lip.
Figure 2D:
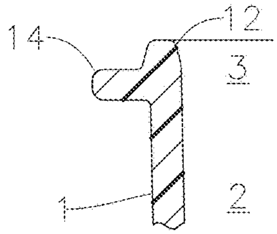
FIG. 2D is the top portion of FIG. 2A with another alternative lip.
Figure 2E:
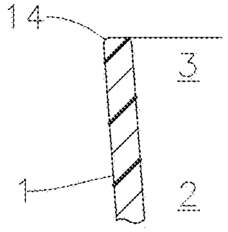
FIG. 2E is the top portion of FIG. 2A with another alternative lip.
Figure 3:
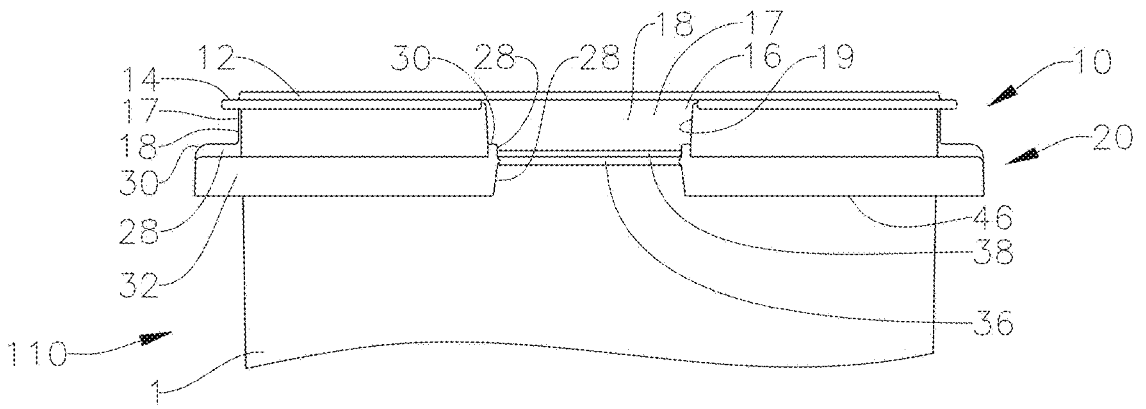
FIG. 3 is an end view the upper portion of the bin of the first embodiment.

As shown in alternative cross-sections 16A and 16B, the risers 26 of the pockets 22 extend higher than in the first embodiment and the guides 30, which do not extend above the risers 26, join the wall 1 at an elevation below the risers 26. FIGS. 2A, 16A and 16B. In FIG. 16A, the guide 30 proceeds inward from the riser 26 and then turns downward, forming a distinct channel 31 for inserting the extended bag-excess 74 into the adjacent pocket 22. FIG. 16A.

The second embodiment also differs from the first embodiment in having a wall 1 and an interior space 2 that permit the nesting of a bin 110 in an identical bin 110 and the upper assembly 411 rests on, or slightly above, the ring 301 of the lower assembly 411. FIG. 17. As in the first embodiment, when the receptacle assembly is assembled (e.g., when the ring 301 (or a lid 302) of the second embodiment is engaged with its bin 110 in which a bag 71 has been installed to form the bin-ring assembly 411 or the bin-lid assembly 412), a rim-space 60 is defined between the wall 1 and a peripheral portion of the receptacle assembly that includes a peripheral portion of the ring 301 (or the lid 302) (e.g., the rim-space 60 is formed between the wall 1 of the bin 110 and the face 82 of the ring 301 (or the lid 302)). The rim-space 60 surrounds the interior space 2 of the bin 110. In one or more embodiments, the rim-space 60 may be a continuous ring-shaped space. The rim-space 60 contains the structure 20 and is capable of containing a bag-edge 72, a bag-border 73 and bag-excess 74. FIGS. 6, 7, 8, 9 9A, 9B, 9C, 10, 11, 12, 13, 14,15, 15A, 15B, 15C, 16, 16A, 16B and 17.

Figure 18:
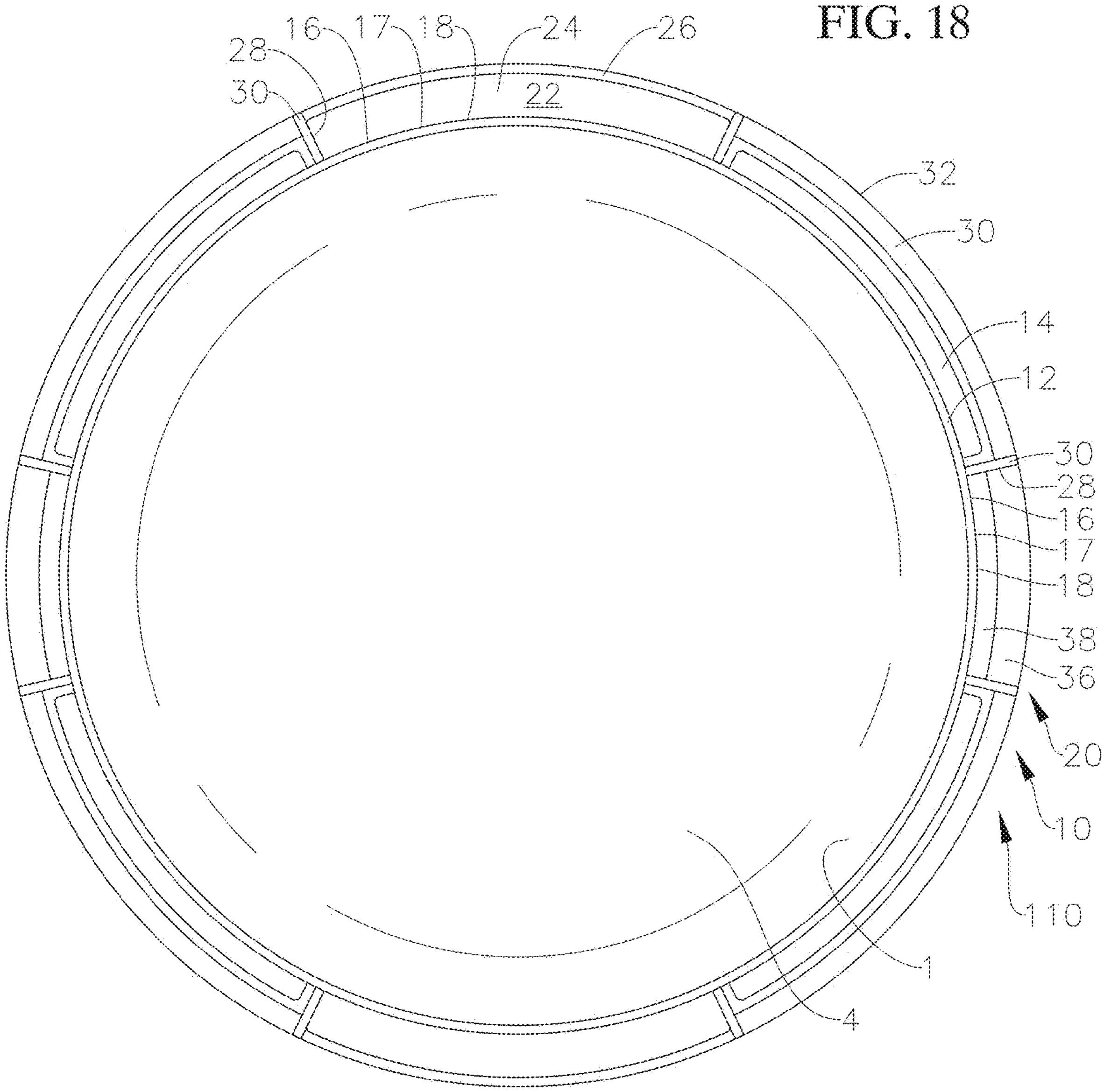
FIG. 18 is a top view of the bin of the third embodiment.
Figure 18A:
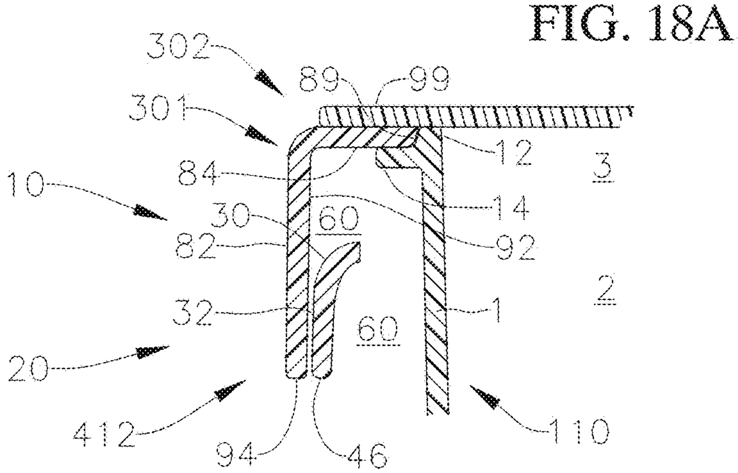
FIG. 18A is a cross section of an upper portion of a bin-lid assembly of the third embodiment.

The third embodiment of the receptacle assembly, indicated in FIGS. 18 and 18A, includes a bin 110 with a mouth 3 that is circular and accordingly a ring 301 and lid 302 which, when viewed from above, are annular and circular, respectively. FIG. 18. The bin 110 of the second embodiment does not have an end 6, corner 7 or a side 8, but as in the first embodiment, the rim 10 includes the upper portion of the wall 1, four lips 14 that extend outward from the wall 1, four gaps 16, four areas 17, four double-tapers 18, a barrier 12 that surrounds the mouth 3 at the top of the wall 1, and a structure 20 that includes the same elements as in the first embodiment, including two ledges 36, four bridges 32 and two pockets 22. FIGS. 1, 2, 3, 4, 5, 18. The ledges 36 permit engagement and disengagement of a ring 301 (or lid 302) which, as in the first embodiment, complete the installation of a liner 71.

Unlike the one-piece lid 302 of the first embodiment, the lid 302 of the third embodiment includes at least two pieces: a ring 301 of the third embodiment and a top 99 which rests on the barrier 12 and on the cover 84 of the ring 301. FIG. 18A. The top 99 may include means for lifting the top horizontally upward from, and lowering the top horizontally downward to, its resting position; alternatively, the top 99 may be hinged to the ring 301 and rotated to and from its horizontal resting position. FIG. 18A. The top 99 may include air holes and a removable filter, for use in covering organic materials collected for composting. FIG. 18A. Alternatively, the top 99 may be permanently attached to the ring 301 and may include a hole above the mouth 3 of the bin 110, thus allowing articles, such as trash, to be dropped in the bin 110 with the lid 302 in place. FIG. 18A. When the receptacle assembly is assembled (e.g., a ring 301 or a lid 302 of the third embodiment is engaged with its bin 110 in which a bag 71 has been installed to form the bin-ring assembly 411 or the bin-lid assembly 412), a rim-space 60 is defined between the wall 1 and a peripheral portion of the receptacle assembly that includes a peripheral portion of the ring 301 (or the lid 302) (e.g., the rim-space 60 is formed between the wall 1 of the bin 110 and the face 82 of the ring 301 (or the lid 302)). The rim-space 60 surrounds the interior space 2 of the bin 110. In one or more embodiments, the rim-space 60 may be a continuous ring-shaped space. The rim-space 60 contains the bag-edge 72, the bag-border 73, any bag-excess 74 and the structure 20. FIGS. 6, 7, 8, 9, 9A, 9B, 9C, 10, 11, 12, 15, 15A, 15B, 15C, 18 and 18A.

Figure 19:
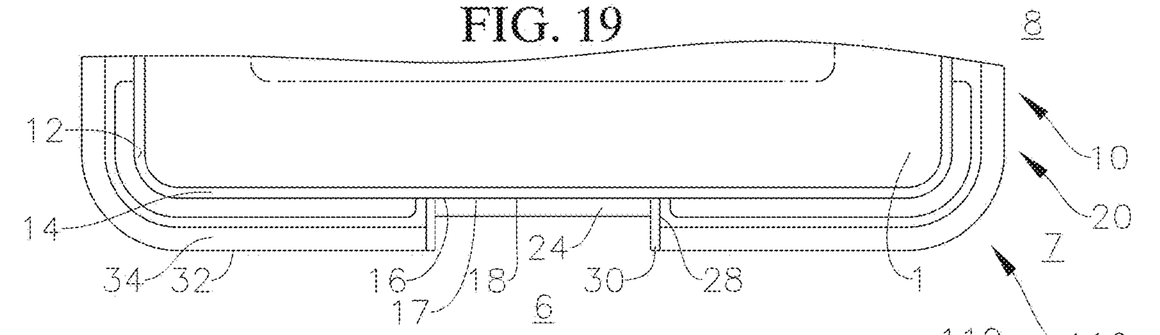
FIG. 19 is a top view at an end of the bin of the fourth embodiment.
Figure 19A:
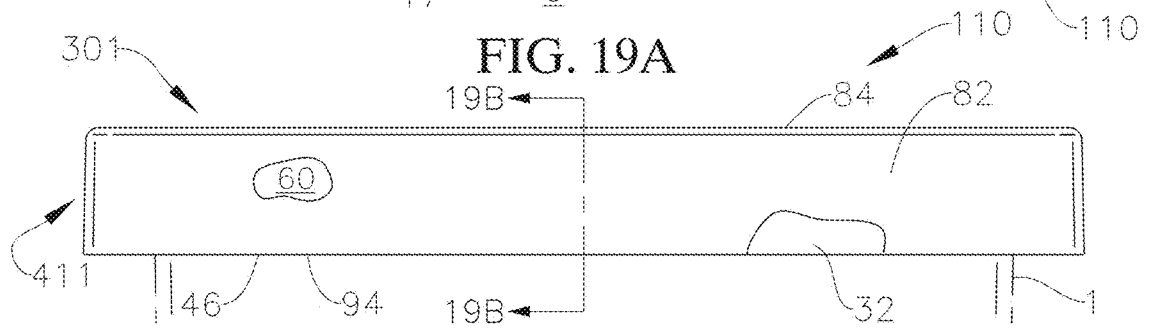
FIG. 19A is an end view of the upper portion of the bin-ring assembly of the fourth embodiment.
Figure 20:
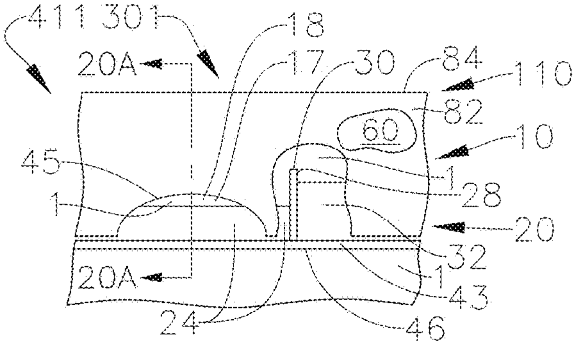
FIG. 20 is a partial end view of an upper portion of a bin-ring assembly of the fourth embodiment showing an alternative disengagement means.
Figure 21:
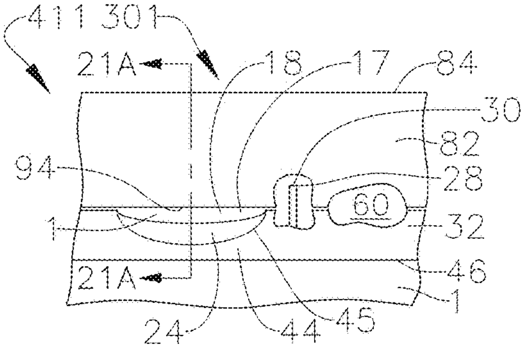
FIG. 21 is a partial end view of an upper portion of a bin-ring assembly of the fourth embodiment showing an alternative disengagement means.
Figure 19B:
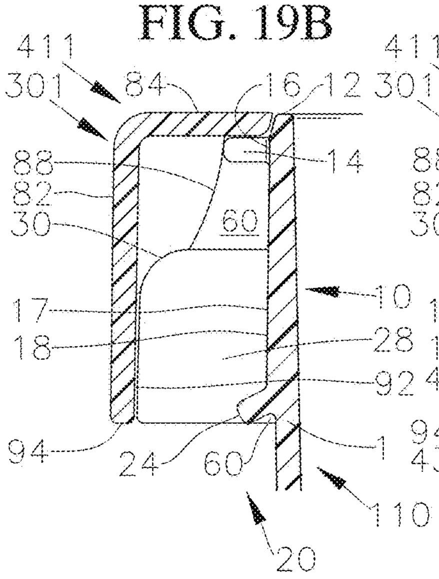
FIG. 19B is a cross section of the end view of FIG. 19A.
Figure 20A:
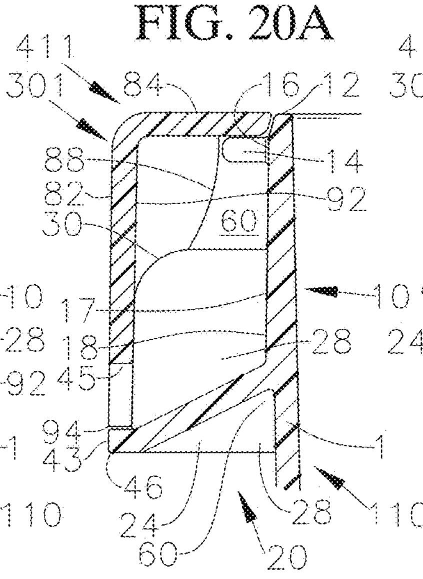
FIG. 20A is a cross section of the partial end view of FIG. 20.
Figure 21A:
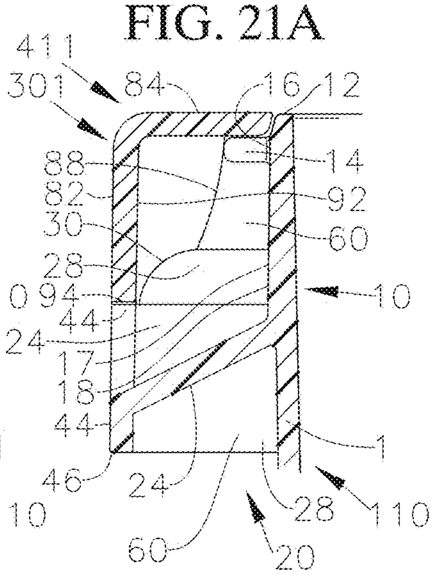
FIG. 21A is a cross section of the partial end view of FIG. 21.

The fourth embodiment of the receptacle assembly, shown in FIGS. 19, 19A, 19B, 20, 20A, 21 and 21A, like the second embodiment, includes a bin 110 with sides 8, ends 6 and corners 7. FIGS. 1, 2, 4, 19 and 20. However, unlike the bin 110*s* of prior embodiments, the bins 110 of the fourth embodiment engage with their rings 301 (and lids 302) by friction fit (i.e., an interference fit or a press fit). FIGS. 19A, 20A and 21A. The interference shown occurs between appropriately placed lips 14 and braces 88 (FIGS. 19A and 21A) and, alternatively, between ribs 28 and inner-faces 92 (FIG. 20A). In one or more embodiments, an interference fit may occur between any other suitable parts, features, or portions of the rim 10 and the ring 301 (and lid 302). Although the ends 6 of the fourth embodiment show only friction fit engagement, one end 6 may be reconfigured to include a hinge that also permits removable attachment of a reciprocally reconfigured rings 301 and lids 302.

In the fourth embodiment, appropriate downward forces on the cover 84 at the opposing ends 6 engage the ring 301 (or lid 302) with an upright, supported bin 110, and, after engagement, appropriate forces, again at the ends 6, disengage the ring 301 (or lid 302) from the bin 110. FIGS. 19, 19A, 19B, 20, 20A, 21 and 21A. First, as shown in FIGS. 19 and 19B, beneath the gap 16, the area 17 and the double-taper 18, a floor 24 extends a short distance outward and downward from the wall 1 and is supported by the wall 1 and the ribs 28. FIGS. 19 and 19B. When thumbs or fingers are inserted at opposing ends 6 beneath the bottom-edge 94 of the face 82 of the ring 301 (or lid 302) and extended inward to gain purchase at the floor 24, simultaneous upward forces at the bottom-edge 94 and downward forces at the floors 24 will disengage the ring 301 (or lid 302) from the bin 110. FIGS. 19, 19A and 19B.

Alternative disengagement means include a first variation shown in FIG. 20, which presents a less inclusive end view of a bin-ring assembly 411 than FIG. 19 and shows the face 82 of the ring 301 interrupted by an opening 45, through which the wall 1 and floor 24 are visible. FIG. 20. The toe 43 surrounds the bin 310 and, at each end 6, joins the floor 24. When the ring 301 is engaged with the bin 110, the bottom-edge 94 of the face 82 rests immediately above the toe 43 except where the openings 45 interrupt the face 82. FIGS. 20 and 20A. At the opposing openings 45, a thumb may be inserted, nail up, so that the bottom of the thumb gains purchase on the oblique floor 24, thus applying a downward force on the floor 24 and an upward force on the ring 301 (or lid 302) at the top of the opening 45. FIGS. 20 and 20A. Alternative disengagement means also include a second variation, shown in FIGS. 21 and 21A. In FIGS. 21 and 21A, the disengagement means again include an opening 45, but the opening 45 interrupts the frontage 44 of a structure 20 of the bin 110, and when the ring 301 (or lid 302) is engaged with the bin 110, the face 82 and its bottom-edge 94 extend downward to the top of the opening 45. FIGS. 21 and 21A. The opening 45 again allows opposing forces, but here the thumb gains purchase on a concave floor 24. FIGS. 21 and 21A.

Although engagement means and disengagement means vary, the rims 10 and rings 301 (and lids 302) of the fourth embodiment a securely clamp the bag 71 and conceal bag-edges 72, bag-borders 73 and any bag-excess 74 in the same fashion as the rim 10 and ring 301 (and lid 302) of the first embodiment. FIGS. 1, 6, 7, 9, 13, 14, 15, 19-21A. When the receptacle assembly is assembled (e.g., a ring 301 (or a lid 302) of the fourth embodiment is engaged with its bin 110 in which a bag 71 has been installed to form the bin-ring assembly 411 or the bin-lid assembly 412), a rim-space 60 is defined between the wall 1 and a peripheral portion of the receptacle assembly that includes a peripheral portion of the ring 301 (or the lid 302) (e.g., the rim-space 60 is formed between the wall 1 of the bin 110 and the face 82 of the ring 301 (or the lid 302). The rim-space 60 surrounds the interior space 2 of the bin 110 and contains the bag-edge 72, the bag-border 73, any bag-excess 74 and at least a portion of the structure 20. In one or more embodiments, the rim-space 60 is formed between the wall 1 of the bin 110 on the one hand, and on the other hand the face 82 of the ring 301 (or the lid 302), and the frontage 44 of the bin 110. FIG. 21A. Similarly, in one or more embodiments, the rim-space 60 is formed between the wall 1 of the bin 110 on the one hand, and on the other hand the face 82 of the ring 301 (or the lid 302), and the tab 43 at the handle 46 of the bin 110. FIG. 20A. In one or more embodiments, the rim-space 60 may be a continuous ring-shaped space.

In previous embodiments, the barrier 12, and thus the mouth 3, lies in a single plane that parallels the plane of the resting edge of the footing 5. FIGS. 1, 2, 3, 4, 8, 16. However, in the fourth embodiment the barrier 12 may be different: the wall 1 at one end 6 may have an elevation less than the wall 1 at the opposing end 6, and the ridge of the barrier 12 may lie in a plane that is not parallel to the plane of the resting edge of the footing 5. FIGS. 1, 2, 3, 4, 8, 16 and 19. Further, the wall 1 at the two sides 8 may extend to an elevation greater than the wall 1 at one or both ends 6, and the barrier 12 may lie in two or more planes. FIGS. 1, 2, 3, 4, 8, 16 and 19. In all of these cases, as in all prior embodiments, the ring 301 (FIGS. 6 and 7) and the lid 302 (FIGS. 13, 14, 15 and 18A) are configured to fit the rim 10, including the barrier 12. FIGS. 19 and 19A. Additionally, where a lid 302 is employed and the barrier 12 defines a mouth 3 with two planes that intersect at opposing sides 8 and form a line of intersection parallel to an end 6, a top 99 may cover one plane of the mouth 3 and be hinged along a line parallel to, and in close proximity to, the line formed by the two intersecting planes. FIGS. 6, 7, 13, 14, 16, 18A and 19.

Figure 22:
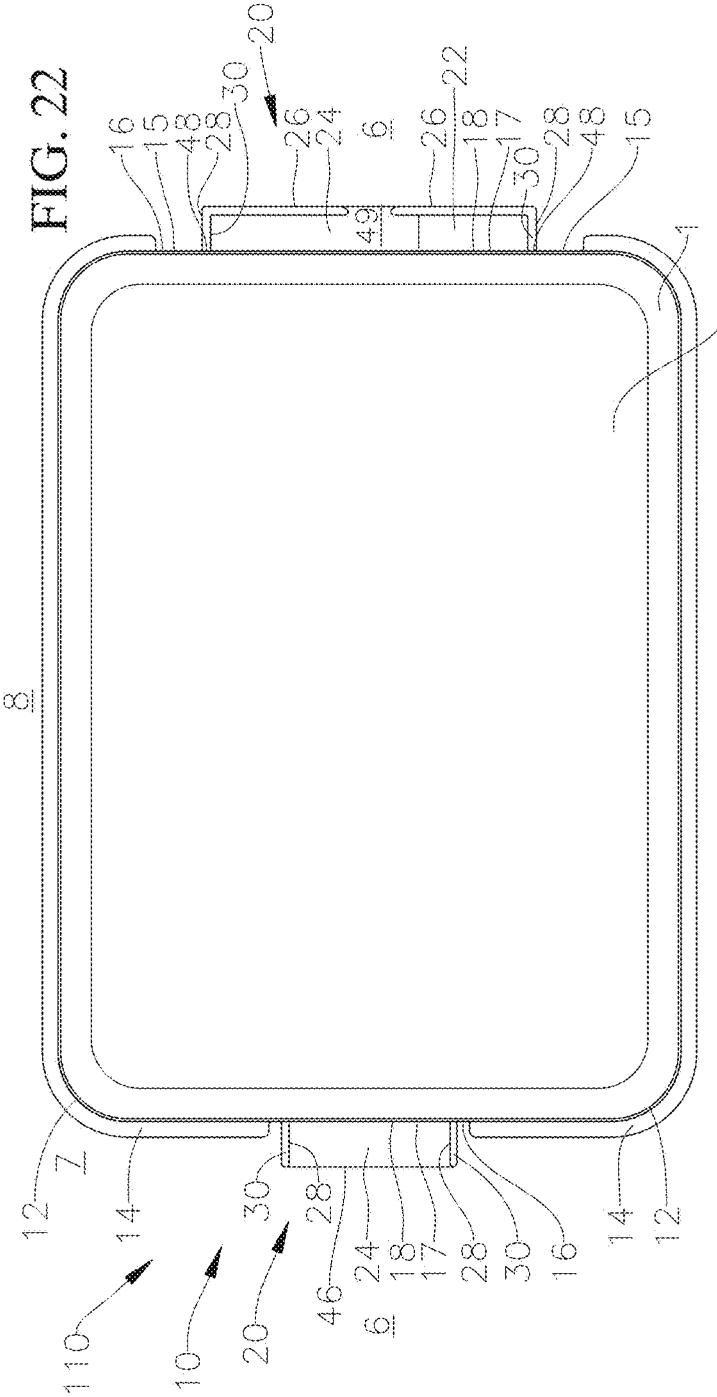
FIG. 22 is a top view of the bin of the fifth embodiment.
Figure 23:
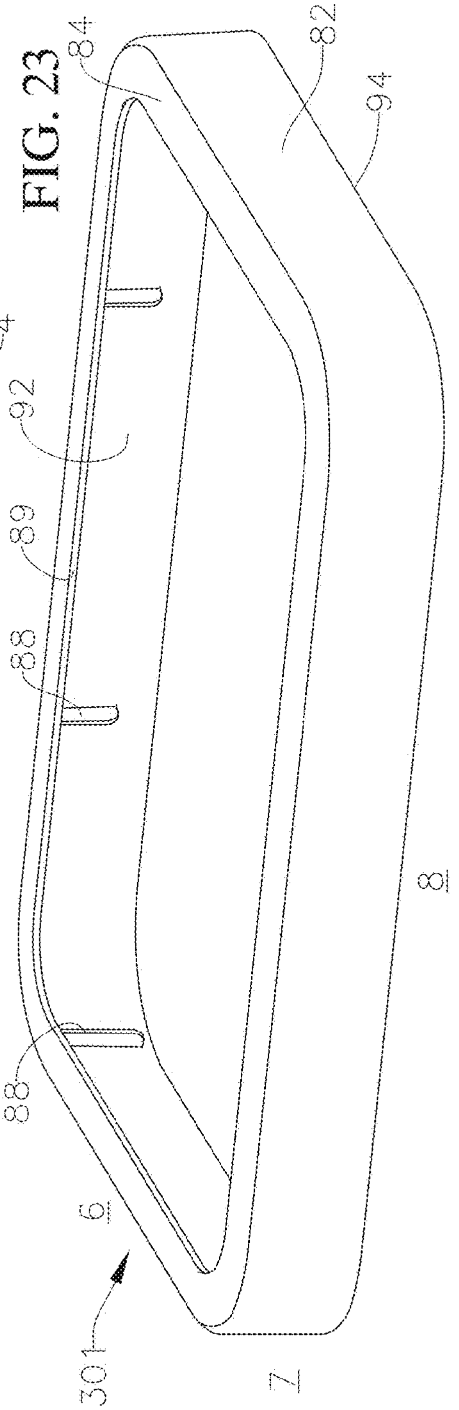
FIG. 23 is an isometric view of the ring of the fifth embodiment.
Figure 24:
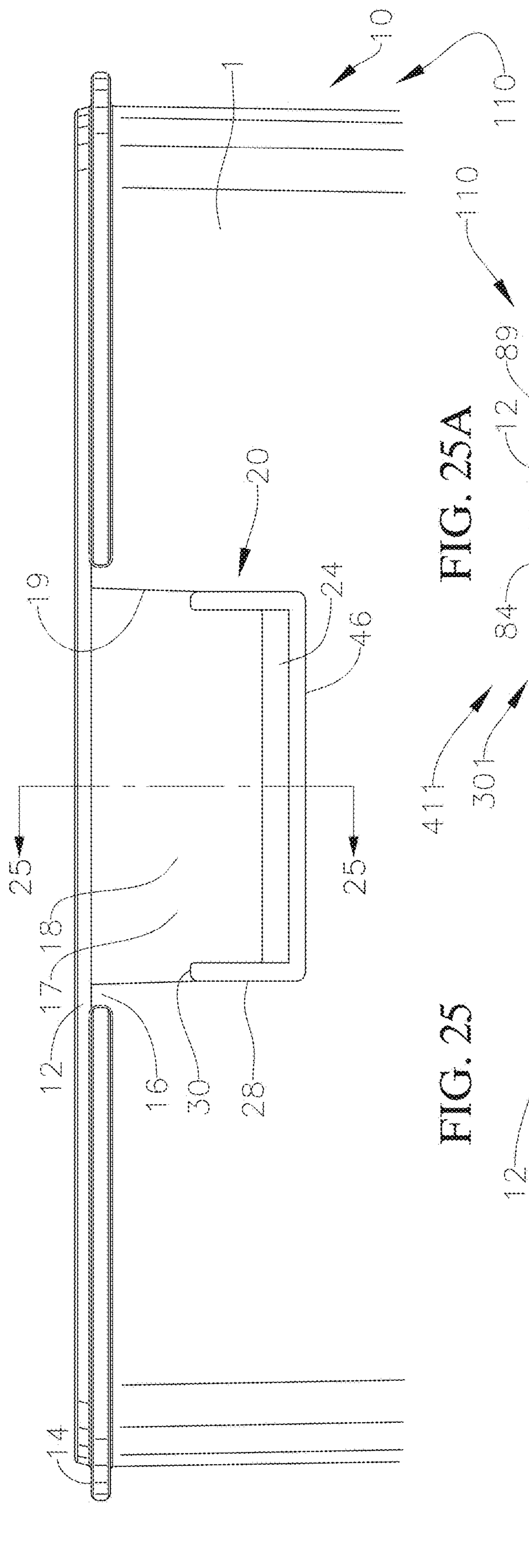
FIG. 24 is an end view of the upper portion of one end of the bin of the fifth embodiment shown in FIG. 22.
Figure 25A:
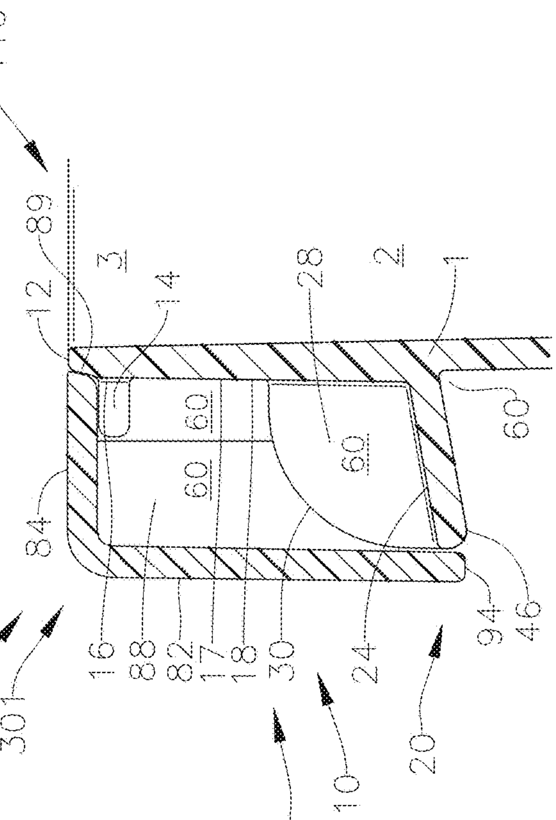
FIG. 25A is a cross section of the upper portion of a bin-ring assembly of the fifth embodiment at the same bin-location shown in FIG. 25.
Figure 25:
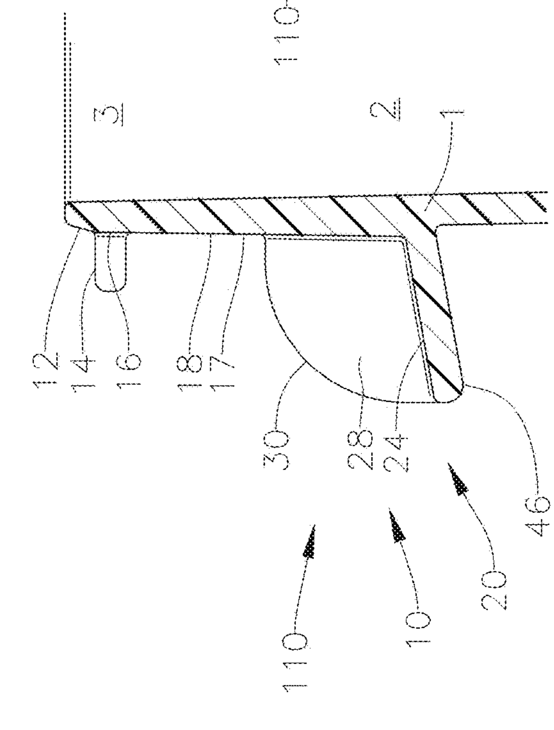
FIG. 25 is a cross section of the upper portion of the end of the bin of the fifth embodiment shown in FIG. 24.

The fifth embodiment of the receptacle assembly, shown in FIGS. 22, 22A, 22B, 23, 24, 25, 25A, 26, 27 and 27A, includes a bin 110 with a rim 10. FIG. 22. The rim 10 includes two lips 14, each extending through the entire length of one of its two sides and the two adjacent corners 7. FIG. 22. At each end 6, there is a gap 16 between the two lips 14 and, below the gap 16, a structure 20. FIG. 22. At one end 6, the structure 20 is handle 46 that may be used to grasp and lift the bin 110 and that includes a floor 24 and two ribs 28. FIGS. 22, 24, 25 and 25A. The top edges of the two ribs 28 form guides 30, which help guide the bag-edge 72 and bag-border 73 above the handle 46 toward the wall 1. Above the floor 24 and the ribs 28, the area 17 of the wall 1 has a double-taper 18 extending outward to the ridges 19. FIGS. 22, 24 and 25.

Figure 22A:
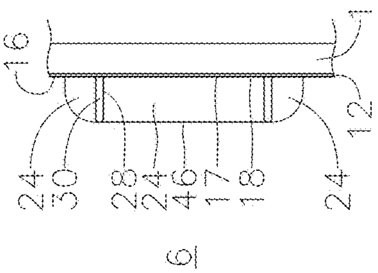
FIG. 22A is a partial top view of an alternative end of the bin of the fifth embodiment.
Figure 22B:
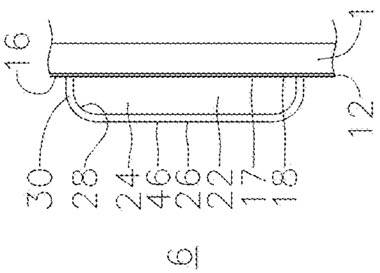
FIG. 22B is a partial top view of another alternative end of the bin of the fifth embodiment.

Alternatives to the handle 46 of FIG. 22 include handles 46 in which the floor 24 has rounded corners. FIGS. 22A and 22B. The ribs 28 may be straight. FIG. 22A. Alternatively, a riser 26 may be added and joined to the ribs 28 so that both the risers 26 and the ribs 28 are rounded. FIG. 22B. Here, in addition to the handle 46, the floor 24, riser 26 and ribs 28 form a pocket 22. FIG. 22B.

Figures 26, 27, 27A:
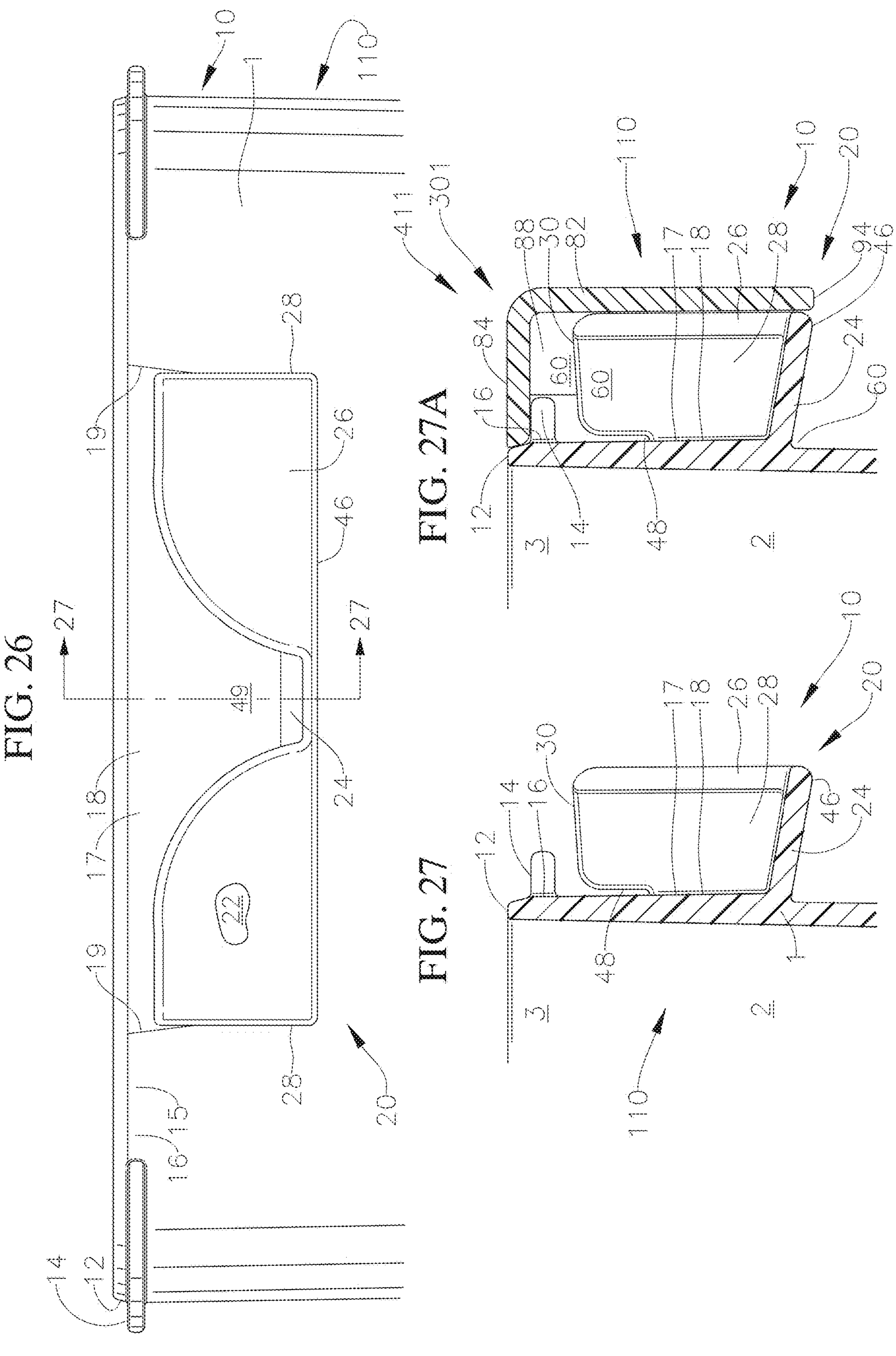
FIG. 26 is an end view of the upper portion of the other end of the bin of the fifth embodiment shown in FIG. 22.
FIG. 27 is a cross section of the upper portion of the end of the bin of the fifth embodiment shown in FIG. 26.
FIG. 27A is a cross section of the upper portion of a bin-ring assembly of the fifth embodiment at the same bin-location shown in FIG. 27.

At the opposite end 6, the structure 20 is a pocket 22 that can also be used as a handle 46 and includes a floor 24, two ribs 28 and a riser 26 interrupted by a break 49. FIGS. 22 and 26. The top edge of each of the two ribs 28 is a guide 30 which turns downward and forms, together with wall 1's double-taper 18, a cinch 48. FIGS. 22 and 27. At both ends 6, above the floors 24 and ribs' 28 junction with the wall 1, the areas 17 of the wall 1 have a double-taper 18 extending outward to the ridges 19. FIGS. 26 and 27.

In the fifth embodiment, the rim 10 facilitates installing and securing a bag 71 while the ring 301 (and lid 302) slide on and off the rim 10 without engaging with the rim 10 or the bin 110. FIGS. 22, 22A, 22B, 23, 24, 25, 25A, 26, 27 and 27A. In the fifth embodiment, as in the first embodiment, installing a bag 71 in the bin 110 begins with placing a bag 71 in the bin 110 so that the bag 71 lines the at least one wall defining the interior space 2 and the bag-edge 72 and bag-border 73 extend above the barrier 12. FIGS. 8, 22, 24 and 26. To complete the installation, one way of proceeding is by facing the end 6 of the bin 110 with the cinches 48, reaching both hands over the bin 110 to the opposing end 6 and, using two hands symmetrically, first looping the bag-edge 72 and bag-border 73 over and under the portions of the lips 14 to the left and right of the handle 46, and above the handle 46 itself, and then, with the looped portion of the bag taunt against the wall 1, pulling the bag-edge 72 and bag-border 73 over and under the entirety of the two lips 14, including the portions of the lips 14 to the left and right of the pocket 22 with the cinches 48. FIGS. 22, 24, 25 and 26. If the bag is sufficiently close fitting, and thus without no significant bag-excess 74 at the wall 1, the bag 71 would already be attached to the rim 10.

Figure 29:
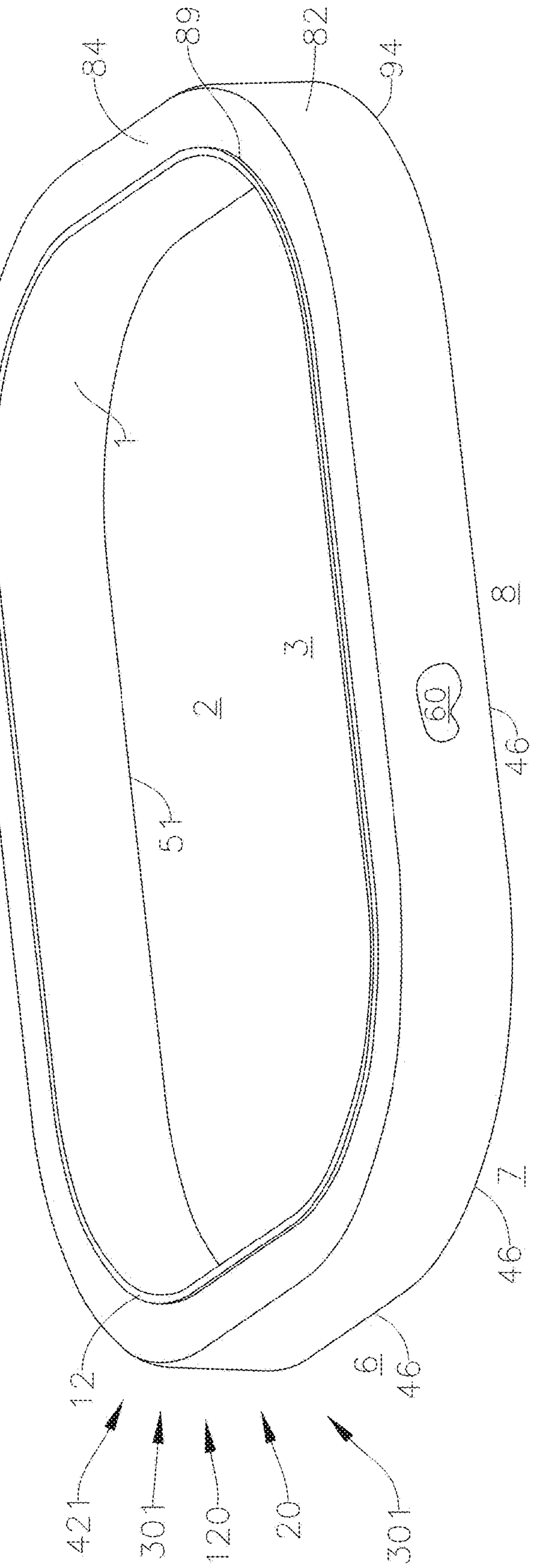
FIG. 29 is an isometric view of the crown-ring assembly of the first embodiment.

If the bag 71 is not sufficiently close-fitting, the pocket 22 permits attaching the bag 71 by cinching the bag-edge 72, bag-border 73 and bag-excess 74 at one or both the two cinches 48 and storing bag-excess 74 in the pocket 22. FIGS. 25, 29 and 30. The bag-excess 74 may be gathered and twisted at the break 49 or in either zone 15 adjacent to the pocket 22. FIGS. 26 and 27. If the bag-border 73 and bag-edge 72 slide freely in one or both cinches 48, bag-excess 74 may be inserted in one or both cinches 48 so that bag-border 73 and bag-edge 72 in the cinches 48 are held in place. FIGS. 22 and 26. Remaining bag-excess 74 may be stored within the pocket 22 to complete the installation of the bag 71. FIGS. 25, 29 and 30.

When a bag 71 has been installed, a ring 301 (or a lid 302) of the fifth embodiment may be placed over the rim 10 forming a bin-ring assembly 411 (and the bin-lid assembly 412) in which the bag-edge 72, the bag-border 73, any bag bag-excess 74, and the two structures 20 are contained within the rim-space 60. FIGS. 9, 9A, 9B, 9C, 10, 11, 12, 15, 15A, 15B, 15C, 22, 23, 25A and 27A. The ring 301 (or the lid 302) of the fifth embodiment, like the rings 301 (and lids 302) of all embodiments, have braces 88 that help guide the ring 301 (and lid 302) into its position on the rim 10. FIGS. 1, 7, 14, 23, 25A and 27A. When a ring 301 (or lid 302) is placed over the rim 10 in which a bag 71 has been installed, the barrier 12 and the over-draped bag 71 shield the inner-edge 89 of the ring 301. FIGS. 9A, 25A and 27A. At both ends 6, the elevation of the bottom-edge 94 of the ring 301 (and the lid 302) coincides with the lowest edges of the floors 24, so the ring 301 and lid 302 do not interfere or detract from use of the handles 46. FIGS. 25A and 27A. In overturning for emptying, the ring 301 and bin 110 may be held sanitarily together by hand at each end 6, thus allowing the bin-ring assembly 411 of the fifth embodiment to be overturned and emptied with the ring 301 in place. FIGS. 22, 23, 25, 25A, 26 and 27A.

Figure 28:
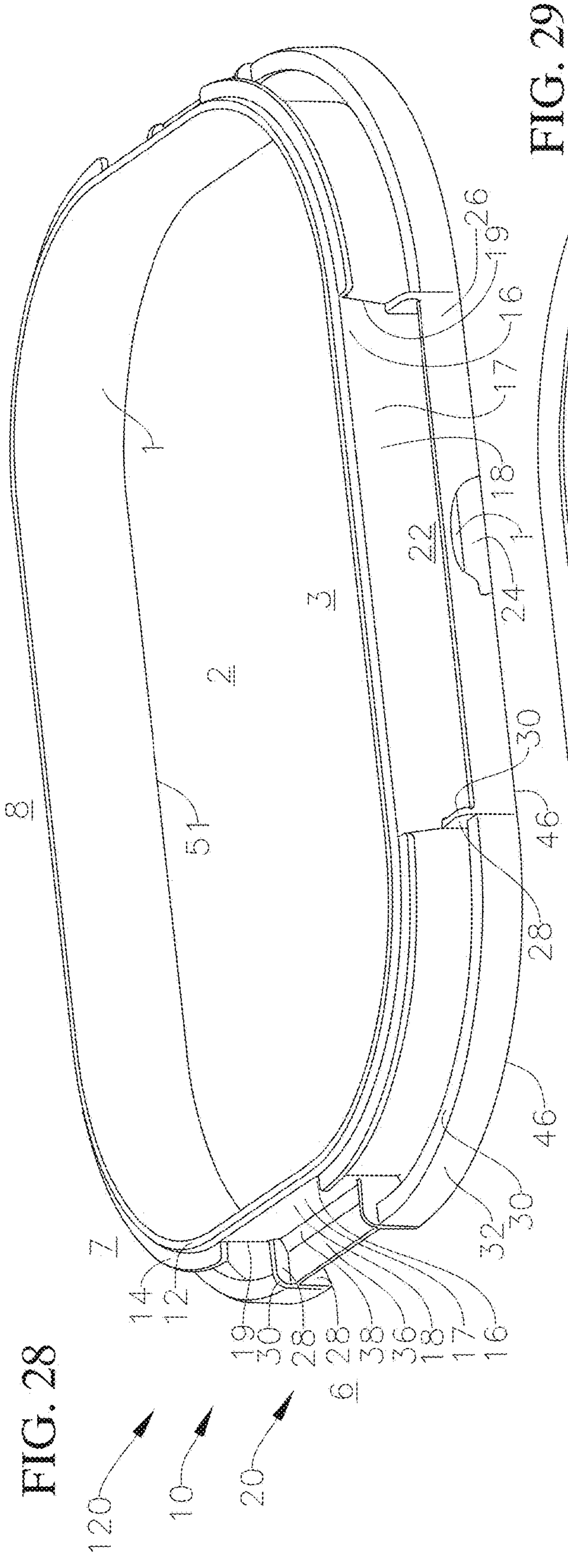
FIG. 28 is an isometric view of the crown of the first embodiment.

The sixth embodiment, shown in FIGS. 28 and 29, is identical to the receptacle assemblies of the first embodiment except that a crown 120 has been substituted for the bin 110. FIGS. 1, 2, 2A, 3, 4, 5, 6, 7, 8, 9, 9A, 9B, 9C, 10, 11, 12, 13, 14,15, 28 and 29. Other crowns 120 can similarly be substituted for the bins 110 of the second through fifth embodiments, and the description of each such embodiment would follow the pattern of this sixth embodiment.

In the sixth embodiment, the rim 10 of the crown 120 is identical to the rim 10 of the bin 110 of the first embodiment, but while the wall 1 of the first embodiment extends downward and joins the bottom 4, the crown 120 has no bottom: its wall 1 extends downward only to the wall-edge 51, which is at the same elevation as the handle 46. FIGS. 1 and 28. The wall 1 of the crown 120 defines the interior space 2, which extends downward to the elevation of the wall-edge 51. When a ring 301 (or a lid 302) is engaged with the crown 120, the bottom-edge 94 of the ring 301 (or the lid 302) is at the same elevation as the wall-edge 51 and the handle 46. FIGS. 28 and 29. The crown 120 may also include attachment means that permit attachment of the crown 120 to a receptacle that is composed of metal, wood, cloth or other rigid or flexible material or materials and that, unlike the crown 120, includes a bottom. The attachment means may extend below the wall-edge 51. FIGS. 1 and 28. Where the crown 120 is attached to a rigid or flexible receptacle, a suspended bag 71 may line the receptacle. When the crown 120 is not attached to a rigid receptacle, the crown 120 may be positioned on, supported by, and removed from a rigid receptacle, wall mount, stand, container, rack or other apparatus that permits the suspension of a bag 71 or of an attached flexible receptacle, and the crown 120 may including positioning means, removal means, and handling means to facilitate use. The positioning means, removal means, and handling means may extend below the wall edge 51.

Installing a bag 71 in the crown 120 begins with placing the bag 71 in the interior space 2 of the crown 120 so that the bag-edge 72 and bag-border 73 extend above the barrier 12. FIGS. 8 and 28. The installation is completed in the same manner as the installation of a bag 71 in the bin 110 of the first embodiment and the engagement of the ring 301 (or lid 302). When the receptacle assembly is assembled (e.g., the ring 301 (or the lid 302) is engaged with the crown 120 of the sixth embodiment in which a bag 71 has been installed to form the crown-ring assembly 421 or the crown-lid assembly 422), a rim-space 60 is defined between the wall 1 and a peripheral portion of the receptacle assembly that includes a peripheral portion of the ring 301 (or the lid 302) (e.g., the rim-space 60 is formed between the wall 1 of the crown 120 and the face 82 of the ring 301 (or the lid 302)). The rim-space 60 surrounds the interior space 2 of the crown 120. In one or more embodiments, the rim-space 60 may be a continuous ring-shaped space. The rim-space 60 contains the bag-edge 72, the bag-border 73, any stored bag-excess 74 and the structure 20. FIGS. 6, 7, 8, 9 9A, 9B, 9C, 10, 11, 12, 13, 14,15, 15A, 15B, 15C and 29.

Crowns 120 may be used in multi-stream units. When supported by a rigid receptacle, one or more crown assemblies 421 and 422 may cover or occupy essentially the entire mouth of the rigid receptacle, with each crown assembly 421 and 422 receiving its own stream; alternatively, one or more crown assemblies 421 and 422 may cover or occupy only a portion of the rigid receptacle's mouth and the remainder of the rigid receptacle's mouth receiving its own stream. When crown assemblies 421 and 422 are supported by a wall mount, stand, container, rack or other apparatus, the supporting device may support one or more crown assemblies 421 and 422, each such assembly receiving its own stream.

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims. Although relative terms such as "outer," "inner," "upper," "lower," "below," "above," "front," "back," and similar terms have been used herein to describe a spatial relationship of one element to another, it is understood that these terms are intended to encompass different orientations of the various elements and components of the invention in addition to the orientation depicted in the figures. Additionally, as used herein, the term "essentially" and similar terms are used as terms of approximation and not as terms of degree, and are intended to account for the inherent deviations in measured or calculated values that would be recognized by those of ordinary skill in the art.

What is claimed is:

1. A receptacle assembly configured to accommodate a bag, the receptacle assembly comprising:

a ring or a lid;

a bin or a crown comprising:

at least one wall defining an interior space;

a mouth in communication with the interior space; and a rim proximate to the mouth, the rim comprising:

at least one lip; and at least one structure, at least a portion of the at least one structure being at an elevation below the at least one lip, wherein, when the receptacle assembly is assembled, a rim-space is defined between the at least one wall and a peripheral portion of the receptacle assembly, the peripheral portion of the receptacle assembly comprising a peripheral portion of the ring or the lid, the rim-space being configured to accommodate an edge and a border of the bag, wherein, when the receptacle assembly is assembled, the at least one structure extends into the rim-space, and wherein above a junction of the at least one wall and the at least one structure, an area of the at least one wall is double-tapered.

2. The receptacle of claim 1 wherein the rim comprises at least one gap along which the at least one lip does not extend.

3. The receptacle assembly of claim 1, wherein at an upper end of the least one wall a barrier extends above the at least one lip and, when the ring is fit over the rim, the barrier is adjacent to an inner edge of the ring.

4. The receptacle assembly of claim 1, wherein the at least one structure comprises at least one handle.

5. The receptacle assembly of claim 1, wherein the at least one structure comprises at least one rib.

6. The receptacle assembly of claim 1, wherein the at least one structure comprises at least one bridge.

7. The receptacle assembly of claim 1, wherein the at least one structure comprises a pocket.

8. The receptacle assembly of claim 1, wherein the at least one structure comprises a floor.

9. The receptacle assembly of claim 1, wherein the at least one structure comprises at least one ledge.

10. The receptacle assembly of claim 1, wherein the at least one structure comprises at least one guide.

11. The receptacle assembly of claim 1, wherein at least one structure comprises at least one riser.

12. The receptacle assembly of claim 1, wherein the at least one structure comprises at least one cinch.

13. The receptacle assembly of claim 1, wherein the at least one structure surrounds the interior space.

14. The receptacle assembly of claim 1, wherein the receptacle assembly comprises at least one opening.

15. The receptacle assembly of claim 1, wherein the ring or the lid comprises at least one latching engagement with the bin or the crown.

16. The receptacle assembly of claim 1, wherein the ring or the lid comprises at least one friction fit engagement with the bin or the crown.

17. The receptacle assembly of claim 1, wherein, when receptacle assembly is assembled, the at least one lip extends into the rim-space.

18. The receptacle assembly of claim 1, wherein the rim-space is a continuous ring-shaped space.

19. The receptacle assembly of claim 1, wherein the peripheral portion of the receptacle assembly further comprises a frontage or a tab of the at least one structure.

20. A receptacle assembly configured to accommodate a bag, the receptacle assembly comprising:

a ring or a lid;

a bin or a crown comprising:

at least one wall defining an interior space;

a mouth in communication with the interior space; and a rim proximate to the mouth, the rim comprising:

at least one lip; and at least one structure, at least a portion of the at least one structure being at an elevation below the at least one lip, wherein, when the receptacle assembly is assembled, a rim-space is defined between the at least one wall and a peripheral portion of the receptacle assembly, the peripheral portion of the receptacle assembly comprising a peripheral portion of the ring or the lid, the rim-space being configured to accommodate an edge and a border of the bag, wherein, when the receptacle assembly is assembled, the at least one structure extends into the rim-space, and wherein the at least one structure does not surround the interior space.

21. A receptacle assembly configured to accommodate a bag, the receptacle assembly comprising:

a ring or a lid;

a bin or a crown comprising:

at least one wall defining an interior space;

a mouth in communication with the interior space; and a rim proximate to the mouth, the rim comprising:

at least one lip; and at least one structure, at least a portion of the at least one structure being at an elevation below the at least one lip, wherein, when the receptacle assembly is assembled, a rim-space is defined between the at least one wall and a peripheral portion of the receptacle assembly, the peripheral portion of the receptacle assembly comprising a peripheral portion of the ring or the lid, the rim-space being configured to accommodate an edge and a border of the bag, wherein, when the receptacle assembly is assembled, the at least one structure extends into the rim-space, and wherein the ring or the lid comprises neither a latching engagement nor a friction fit engagement with the bin or the crown.

* * * * *